United States Patent [19]
Luce et al.

[11] Patent Number: 5,420,782
[45] Date of Patent: May 30, 1995

[54] ELECTRONIC COMMUTATION FOR A MOVING MAGNETIC FIELD ELECTRIC POWER CONVERTER

[75] Inventors: John W. Luce; Kenneth A. Buckle, both of Tampa, Fla.

[73] Assignee: University of South Florida, Tampa, Fla.

[21] Appl. No.: 80,169

[22] Filed: Jun. 18, 1993

[51] Int. Cl.⁶ .............................................. H02M 7/60
[52] U.S. Cl. ................................................ 363/109
[58] Field of Search ............................. 363/109, 131

[56] References Cited
U.S. PATENT DOCUMENTS 3,879,650  4/1975  Lachocki .
4,614,998  9/1986  Rilly ................................ 363/131 X
4,870,558  9/1989  Luce ...................................... 363/87

Primary Examiner—Steven L. Stephan
Assistant Examiner—E. To
Attorney, Agent, or Firm—Dominik, Stein, Saccocio, Reese, Colitz & Van Der Wall

[57] ABSTRACT

An apparatus and method for inverting direct current electrical power into alternating current electrical power by producing a moving magnetic field having substantially constant flux density when the direct current power is applied to a primary winding, magnetically coupling a secondary winding to the moving magnetic field and creating a substantially triangular-shaped current in each phase of the primary winding so as to produce substantially sinusoidal alternating current in each phase of the secondary winding.

42 Claims, 23 Drawing Sheets

COIL CURRENT VERSUS TIME

COIL TAP CURRENT VERSUS TIME

Fig. 14 COIL CURRENT FOR 7 MESH INVERTER VS ωt IN RADIANS

Fig. 15 MMF MAGNITUDE AND ANGLE VS ωt IN RADIANS, 7 MESH INVERTER

Fig. 16 NORMALIZED NODE CURRENTS FOR 7 MESH INVERTER VS $\omega t$ IN RADIANS

INPUT TRIANGLE WAVE

VOLTAGE VS TIME AND 2B CURRENT VS TIME

PWM VOLTAGE WAVEFORM

ELECTRONIC COMMUTATION FOR A MOVING MAGNETIC FIELD ELECTRIC POWER CONVERTER

BACKGROUND OF THE INVENTION

1. Field of the Invention

This invention relates to a linear electronic commutation apparatus and method for using direct current to produce a substantially uniform rotating magnetic field and then using the rotating field in a direct current to alternating current inverter, in an electric motor and in a synchronous condenser.

2. Description of the Background Art

DC-AC Inverter

Presently there exist many types of inverters, many of them electronic, for converting electrical power from DC to AC. Typically, electronic inverters produce a square wave output waveform which inherently contains harmonics that are usually undesirable but often tolerable. Improved inverters have been developed which attempt to approximate a sine wave through the use of six pairs of controlled rectifiers thereby producing an alternating square wave output crudely approximating a sine wave and whose frequency is determined by the firing of the controlled rectifiers. Disadvantageously, these six step inverters also draw DC discontinuously rather than continuously.

In a previous invention of one of the inventors hereof, an improved DC to AC inverter was disclosed that employed a magnetic field rotating at a substantially constant angular velocity and having a substantially constant flux density. Specifically, as set forth in U.S. Pat. No. 4,870,558 entitled "Moving Magnetic Field Electric Power Converter" issued to John W. Luce on Sep. 26, 1989, the disclosure of which is hereby incorporated by reference herein, this prior improved inverter comprised a pair of windings wound on fixedly positioned inner and outer ferromagnetic cores. The DC input winding was wound much in the same manner as the armature windings of a DC generator, with the winding preferably twelve phase star-connected with the neutral brought out. The polyphase winding output was wound much in the same manner as the stator winding of a three phase AC motor, either synchronous or induction (either squirrel cage or wound rotor).

As shown in FIG. 1 hereof, the twelve star-connected input phases of this prior improved DC to AC inverter each included an electronic switch, such as a gate turn off (GTO) thyristor switch, having their outputs connected together and brought out as a negative terminal. The gates of the GTOs were intended to be controlled by means of a switch controller timed by an oscillator according to square waves of the timing diagram of FIG. 2A hereof. Notably, it was contemplated that by gating each of the GTOs in the sequence and with the timing reflected in FIG. 2A hereof, three adjacent GTOs would be successively gated (i.e. turned ON) so that during each cycle, the first GTO would be turned OFF, leaving the other two ON. Then another succeeding adjacent GTO would be turned ON for a repeated total of three GTOs. This alternating three-two-three-two sequence was to be continuously repeated so that at all times at least two GTOs were ON and such that at no time two GTOs would be turned ON (or OFF) simultaneously. The stepped output waveform of FIG. 2B hereof was intended to be obtained.

Advantageously, the input direct current consumption of this prior improved DC to AC inverter was continuous. The magnetic field in the core never totally collapsed which would have otherwise created an inductive kick. Further, with the stepping interval significantly shorter than five electrical time constants of the inverter, the rotating magnetic field moved in discrete steps and at a rate sufficient to preclude steady-state conditions. Further experimentation of this inverter using N channel power MOSFETs for the switches and square wave generators achieved satisfactory three phase output voltage. However, the magnetic field did not move at a perfectly constant angular velocity nor was the magnetic field of a perfectly constant magnitude.

An object of this invention to provide an improved DC to AC inverter that employs a magnetic field created by overlapping triangular-shaped coil currents such that the magnetic field rotates at a nearly perfect constant angular velocity and has a nearly perfect constant flux density, such that input direct current consumption is nearly perfectly continuous and such that three phase output voltage is obtained having nearly perfect sinusoidal waveforms.

DC Motor

A conventional polyphase AC motor comprises a polyphase multipole input or primary winding that is powered by three-phase AC electrical power. There exists many advantages to polyphase AC motors; however, three-phase AC power is required to drive the motor.

Another object of this invention is to provide an improved DC motor having the advantages of a polyphase AC motor, but that employs a magnetic field created by overlapping triangular-shaped coil currents such that the magnetic field rotates at a nearly perfect constant angular velocity and has a nearly perfect constant flux density and such that input DC current consumption is nearly perfectly continuous.

DC Synchronous Condenser

A synchronous condenser comprises basically a synchronous motor connected in parallel with a distribution system that requires low power factor. The synchronous condenser is overexcited to act like a capacitor to take leading KVA, thereby improving the distribution system's power factor. The synchronous condenser is typically operated with no mechanical load. Often, the synchronous condenser is hermetically sealed and operated in an atmosphere of hydrogen to reduce the windage loss and increase the coding effect. However, significant maintenance is still required due to wear. Hence, a synchronous condenser is typically justified when the investment and cost of maintenance is less than the electrical power charged by the power company that may apply a surcharge for low power factor.

Another object of this invention is to provide an improved synchronous condenser with no moving parts that employs a magnetic field created by overlapping triangular-shaped coil currents such that the magnetic field rotates at a nearly perfect constant angular velocity and has a nearly perfect constant flux density and such that input DC current consumption is nearly perfectly continuous.

The foregoing has outlined some of the pertinent objects of the invention. These objects should be construed to merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF THE INVENTION

DC-AC INVERTER

For the purpose of summarizing this invention, this invention comprises a DC to AC inverter further improved from that disclosed in U.S. Pat. No. 4,870,558. Specifically, in embarking on a new approach to further improve the DC to AC invertor, it was again concluded that in order to obtain the desired output of polyphase (e.g. three phase) sinusoidal AC, a magnetic field rotating at a substantially constant angular velocity and having a substantially constant flux density should be employed. However, contrary to the teachings of U.S. Pat. No. 4,870,558, it was discovered that at one instant of time, the desired field could be furnished by an electrical current in just one of the twelve coils and then thirty electrical degrees later, the desired field could be furnished by the same amount of current in an adjacent coil. In between these two points, the desired field would be produced by the vector sum of these two adjacent coils. It was also discovered that if the current in each coil had a triangular shape, then a nearly perfect sinusoidal AC output would be obtained. Upon still further experimentation, an electronic circuit was invented that accurately produces overlapping triangular waveforms for driving the electronic switches, thereby obtaining the nearly perfect sinusoidal AC output from DC input.

DC MOTOR

A DC motor built according to this invention is identical to any particular known polyphase AC motor except for the primary or AC input windings. Instead of the usual polyphase multipole input or primary winding, a winding of the same number of poles is installed, but arranged as the armature winding of a DC shunt motor, having a small odd number of commutator bars, preferably 5 to 9 bars. Actual commutator bars are not necessary, but their connections are brought out to transistor pairs which would be controlled by the same type of control circuit used for the inverter described above. The armature winding is wound on the same core in the same slots that would have been used for the corresponding AC motor. An important factor of this DC motor is the fact that it operates from DC power rather than from 3 phase AC power.

This description includes linear and rotary motors (but not stepper motors), regular or inside out loom motors, and all types of rotors including squirrel cage and wound rotor induction, electromagnetic, permanent magnet and reluctance synchronous motors. It should be noted that if the controller is designed to gradually ramp the frequency from zero up to operating speed, amortisseur or damper windings would not be required for starting such synchronous motors. Induction motors are inherently self starting at operating frequency however, if their frequency is ramped up gradually the usual high surge of starting current can be avoided.

DC SYNCHRONOUS CONDENSER

A synchronous condenser built in accordance with this invention would be essentially identical to any existing synchronous condenser, except for the field winding. Previously the field consisted of a DC winding on a rotating core. In this invention, the field winding is similar to that of a DC shunt motor armature but it does not rotate. The leads that would normally be connected to the commutator bars are connected to the transistor pairs and are controlled by a circuit similar to that used for the inverter described above. An important feature of this synchronous condenser of this invention is the fact that nothing physically rotates, thus permitting the condenser to be oil filled for improved insulation and cooling.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

DC-AC INVERTER

Figure 1:
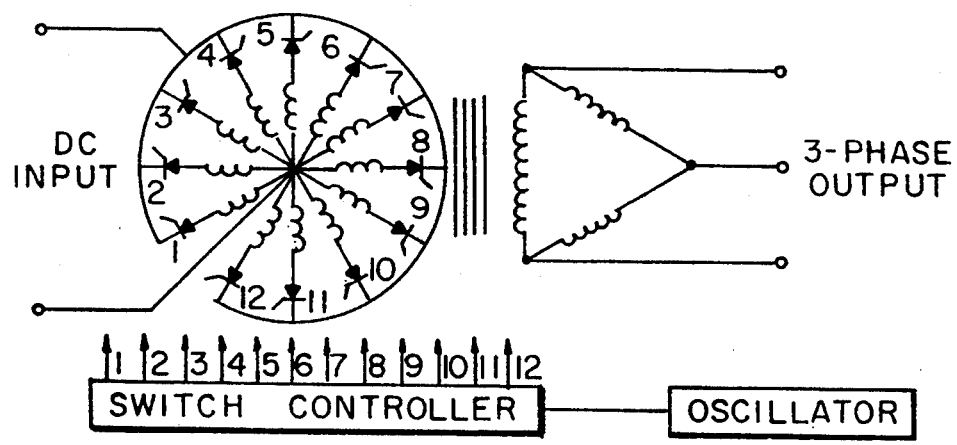
FIG. 1 is a schematic diagram of the prior art electrical power inverter disclosed in U.S. Pat. No. 4,870,558 having three phase delta-connected output windings and twelve phase star-connected input windings with thyristers connected thereto and with the gates of the thyristers controlled by a control circuit.
Figure 3:
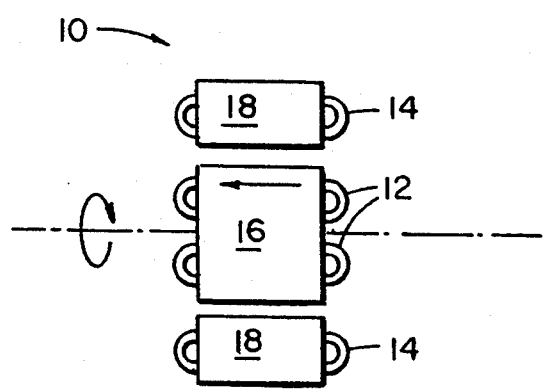
FIG. 3 is a cross-sectional view of the electric power inverter of the present invention illustrating the DC input primary winding wound on an inner ferromagnetic core and the AC output secondary winding wound on an outer ferromagnetic core.
Figure 2A:
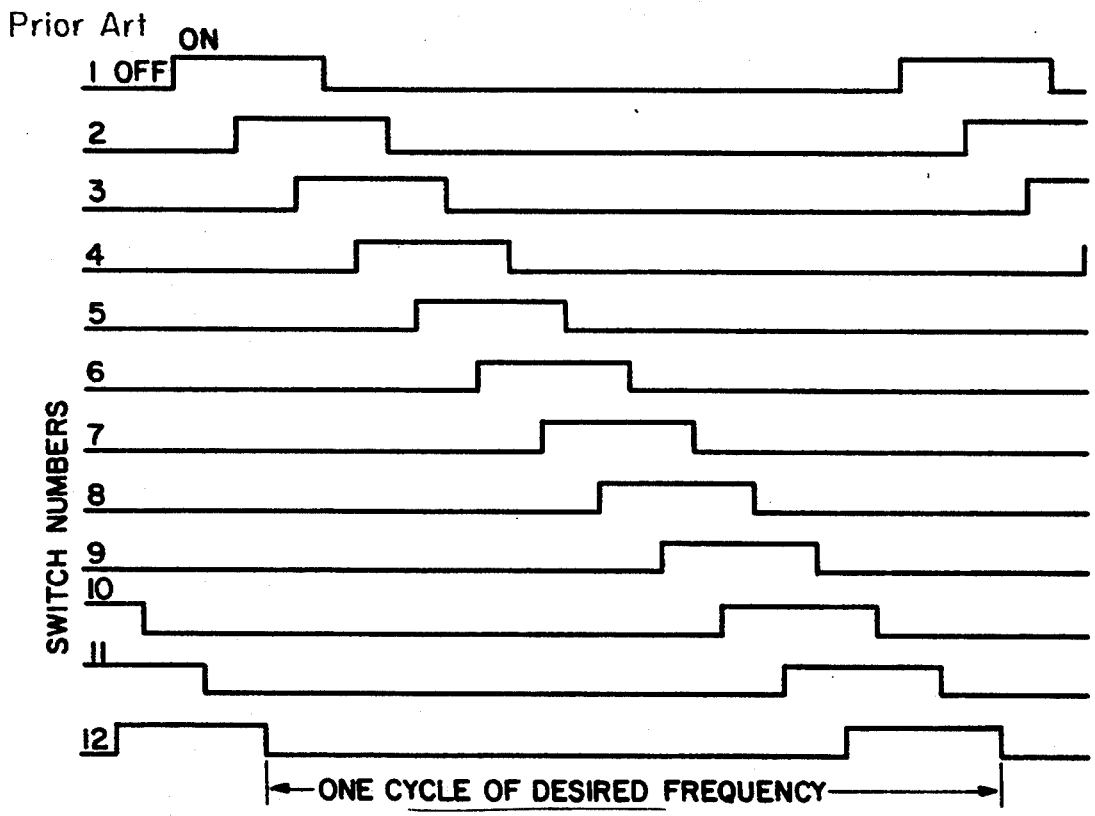
FIG. 2A is a timing diagram of the control circuit of the inverter of FIG. 1.
Figure 2B:
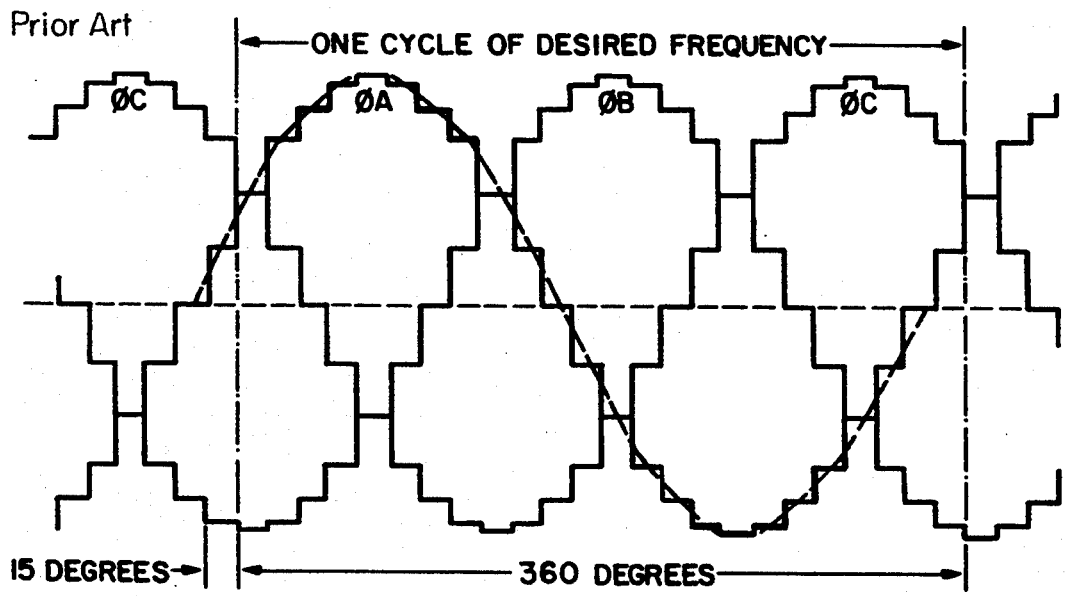
FIG. 2B is the output diagram of the prior art inverter of FIG. 1 when controlled by the timing diagram of FIG. 2A.

As shown in FIG. 3, similar to the prior improved DC to AC inverter of U.S. Pat. No. 4,870,558, this further improved inverter 10 includes a pair of windings 12 and 14 wound on fixedly positioned inner and outer ferromagnetic 16 and 18 cores, respectively. The DC input winding 12 is wound on the inner core 16 much in the same manner as the armature windings of a DC motor. The AC output winding 14 is delta wound on the outer core 18 much in the same manner as the stator winding of a three phase AC generator. However, as more fully described in U.S. Pat. No. 4,870,558, other winding arrangements are feasible.

Star-Connected DC Input Winding

Figure 4:
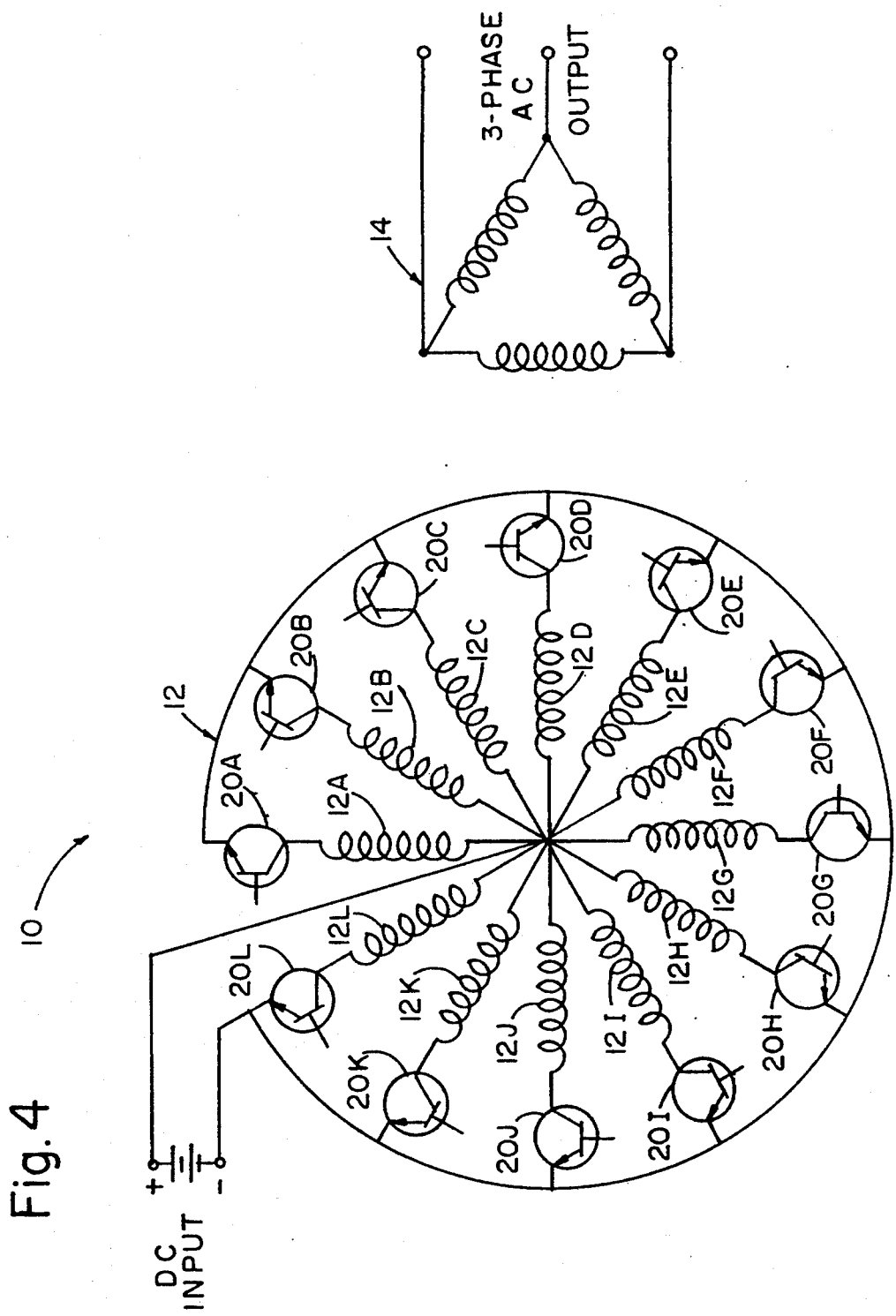
FIG. 4 is a schematic diagram of the electric power inverter of the present invention having a primary DC input winding including twelve coils star-connected and an AC output secondary winding that is delta wound.

As shown in FIG. 4, in one embodiment, the DC input winding 12 comprises twelve coils 12A-12L star-connected, with the neutral brought out as the DC positive input. Transistors 20A-20L are respectively connected in the twelve coils 12A-12L of the input winding 12, with each of their outputs connected together and brought out as a DC negative input. The transistors 20A-20L preferably comprise N or P channel power MOSFETs, or power Darlington bipolar junction or insulated gate bipolar transistors, of either polarity. Transistors 20A-20L may include any other control devices operating in the linear mode (rather than in the switching mode) such as bipolar junction transistors, field effect transistors, Darlington transistors, or other semiconductor devices and also vacuum or other electron tubes.

Figure 5:
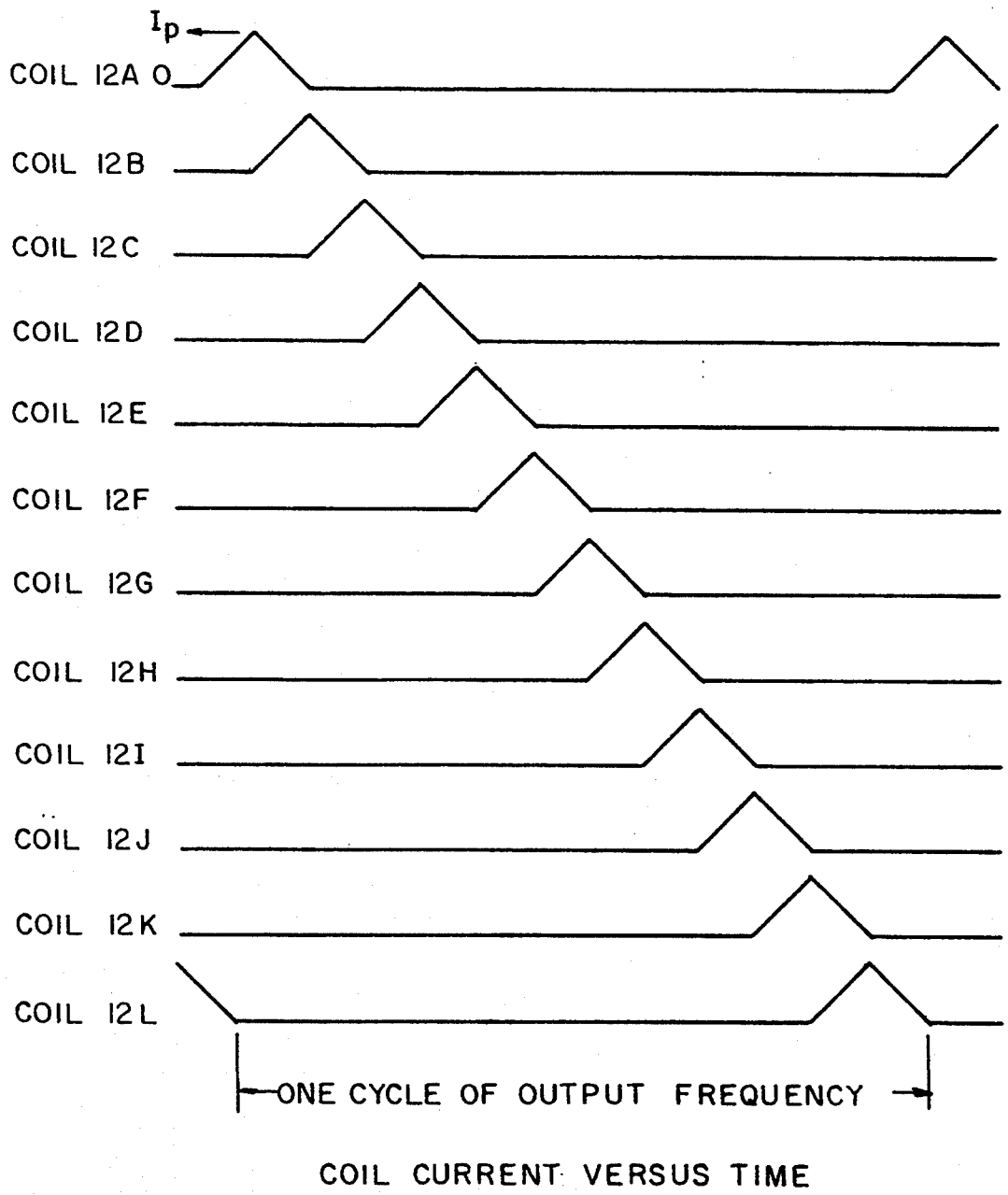
FIG. 5 is a timing diagram of the electrical currents in the respective twelve coils during one cycle.

The electronic switches 20A-20L are operated so as to produce triangular-shaped currents in their respective coils 12A-12L, with the timing indicated in FIG. 5, such that as the current in one coil is decreasing, the current in the next coil is correspondingly increasing. The total current from the DC input therefore remains nearly constant. Further, the succession of overlapping triangular-shaped current pulses produces a rotating magnetic field having a practically constant magnitude and angular velocity, which produces the sinusoidal output voltage at output winding 14. Specifically, the following table lists computed coil currents necessary to produce a perfect magnetic field rotating at a perfect angular velocity and at a perfect constant magnitude:

| POSITION (degrees) | CURRENT Coil #1 (amp) | CURRENT Coil #2 (amp) | CURRENT Total (amp) |
|---|---|---|---|
| 0.00 | 1.0000 | 0.0000 | 1.0000 |
| 3.00 | 0.9080 | 0.1047 | 1.0127 |
| 6.00 | 0.8135 | 0.2091 | 1.0225 |
| 9.00 | 0.7167 | 0.3129 | 1.0296 |
| 12.00 | 0.6180 | 0.4158 | 1.0339 |
| 15.00 | 0.5176 | 0.5176 | 1.0353 |
| 18.00 | 0.4158 | 0.6180 | 1.0339 |
| 21.00 | 0.3129 | 0.7167 | 1.0296 |
| 24.00 | 0.2091 | 0.8135 | 1.0225 |
| 27.00 | 0.1047 | 0.9080 | 1.0127 |
| 30.00 | 0.0000 | 1.0000 | 1.0000 |

Figure 6:
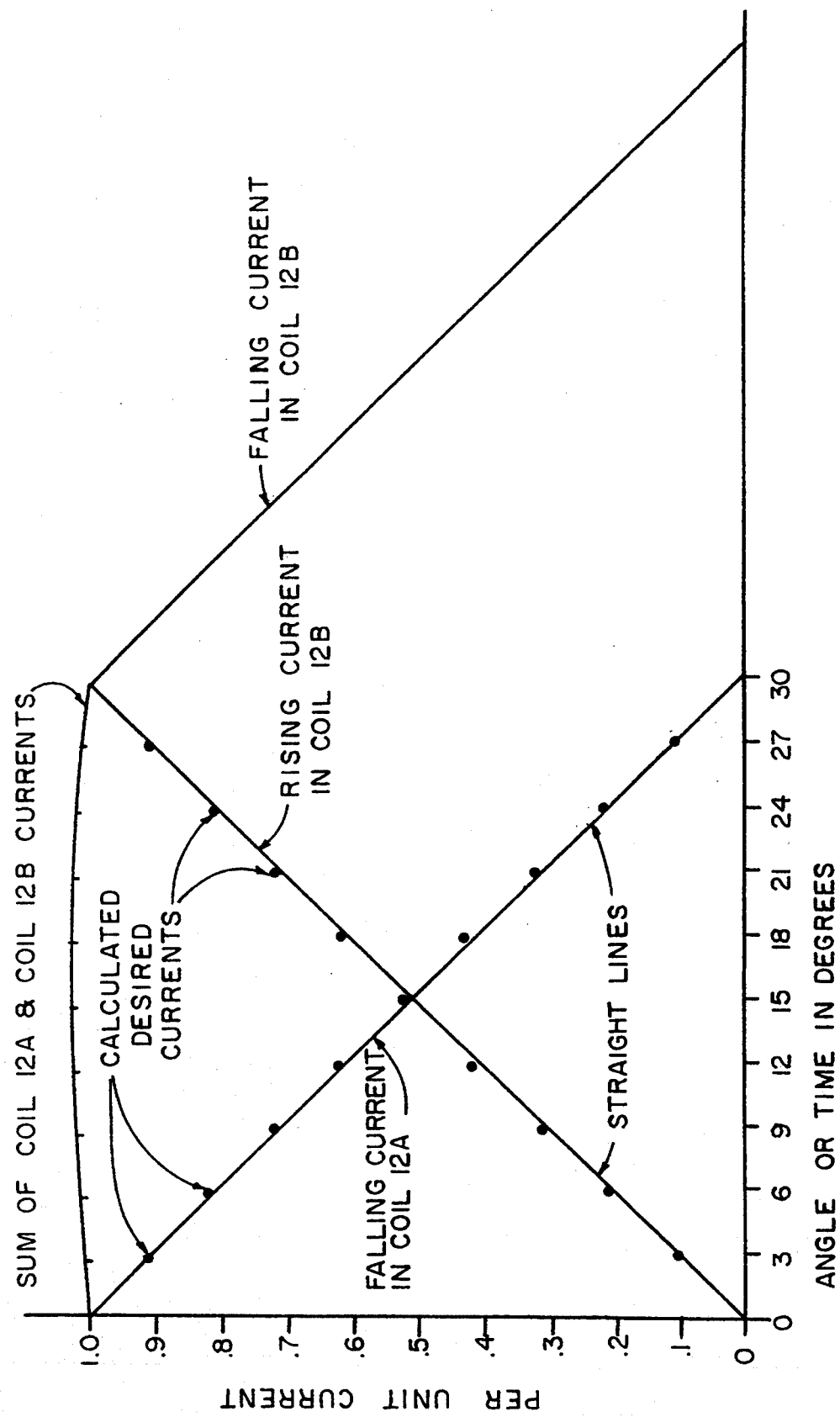
FIG. 6 is a graph illustrating the close approximization of the triangular-shaped current waveforms to the desired current coils.
Figure 7:
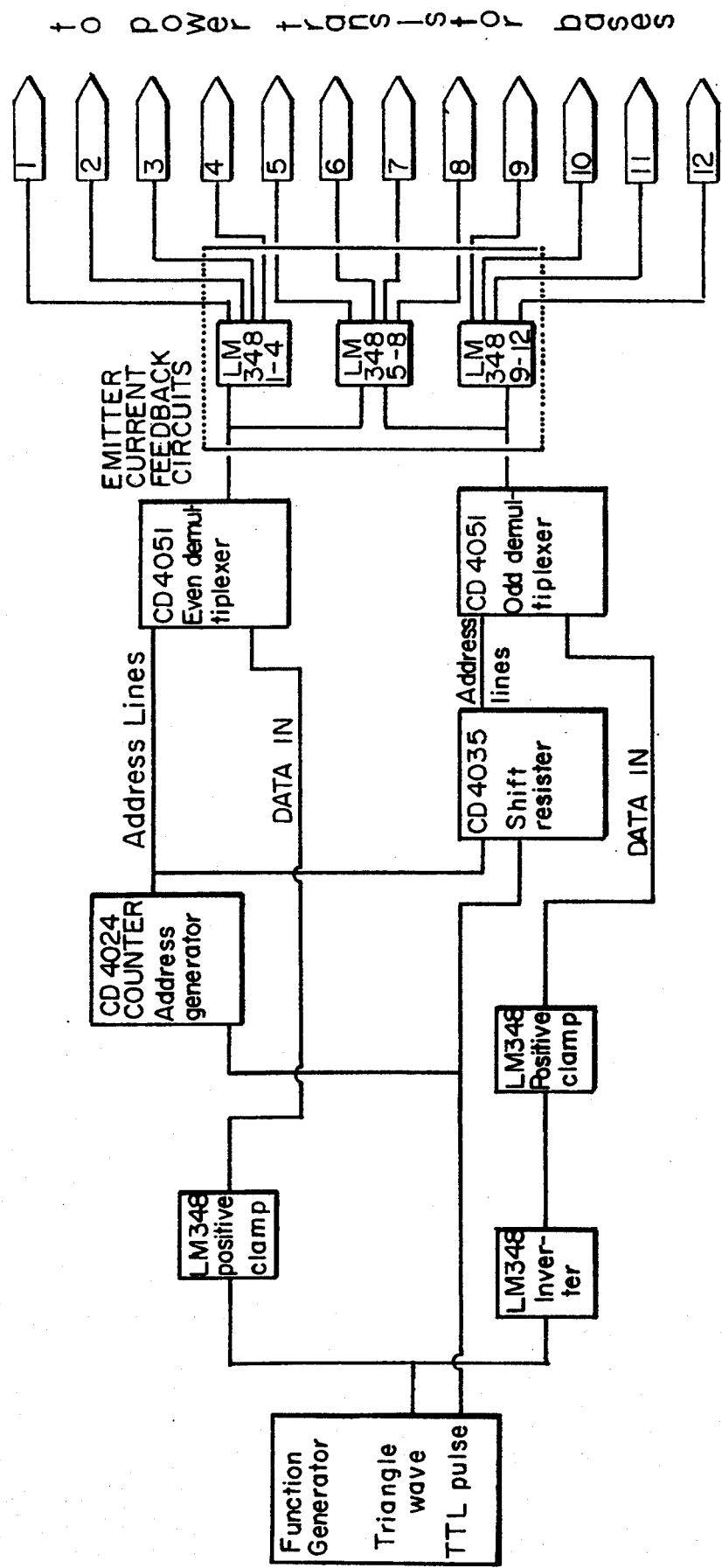
FIG. 7 is a block diagram of the control circuit for powering the twelve coils of the star-connected primary winding.
Figure 8:
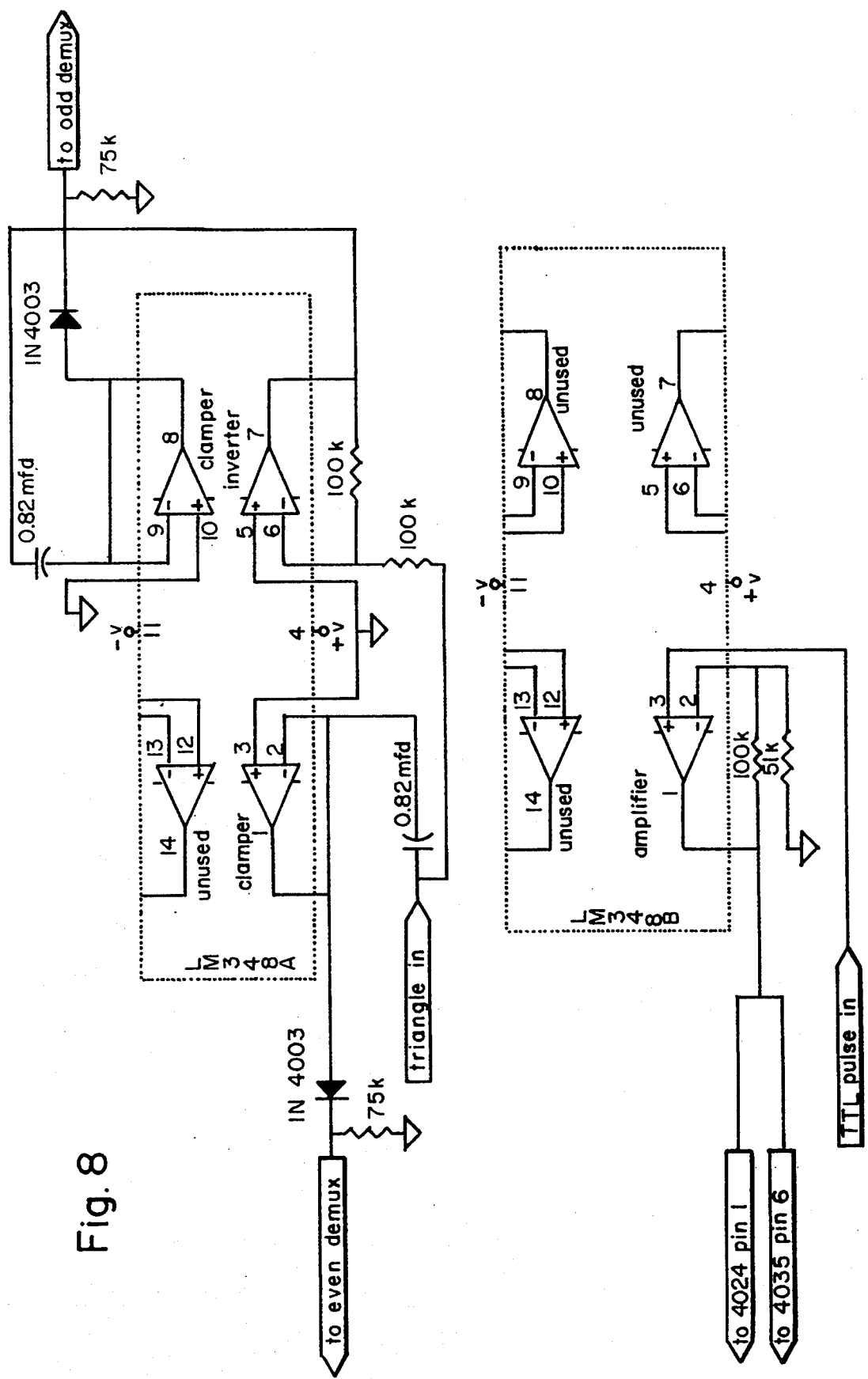
FIG. 8 is a schematic diagram of the analog portion of the control circuit of FIG. 7.
Figure 9:
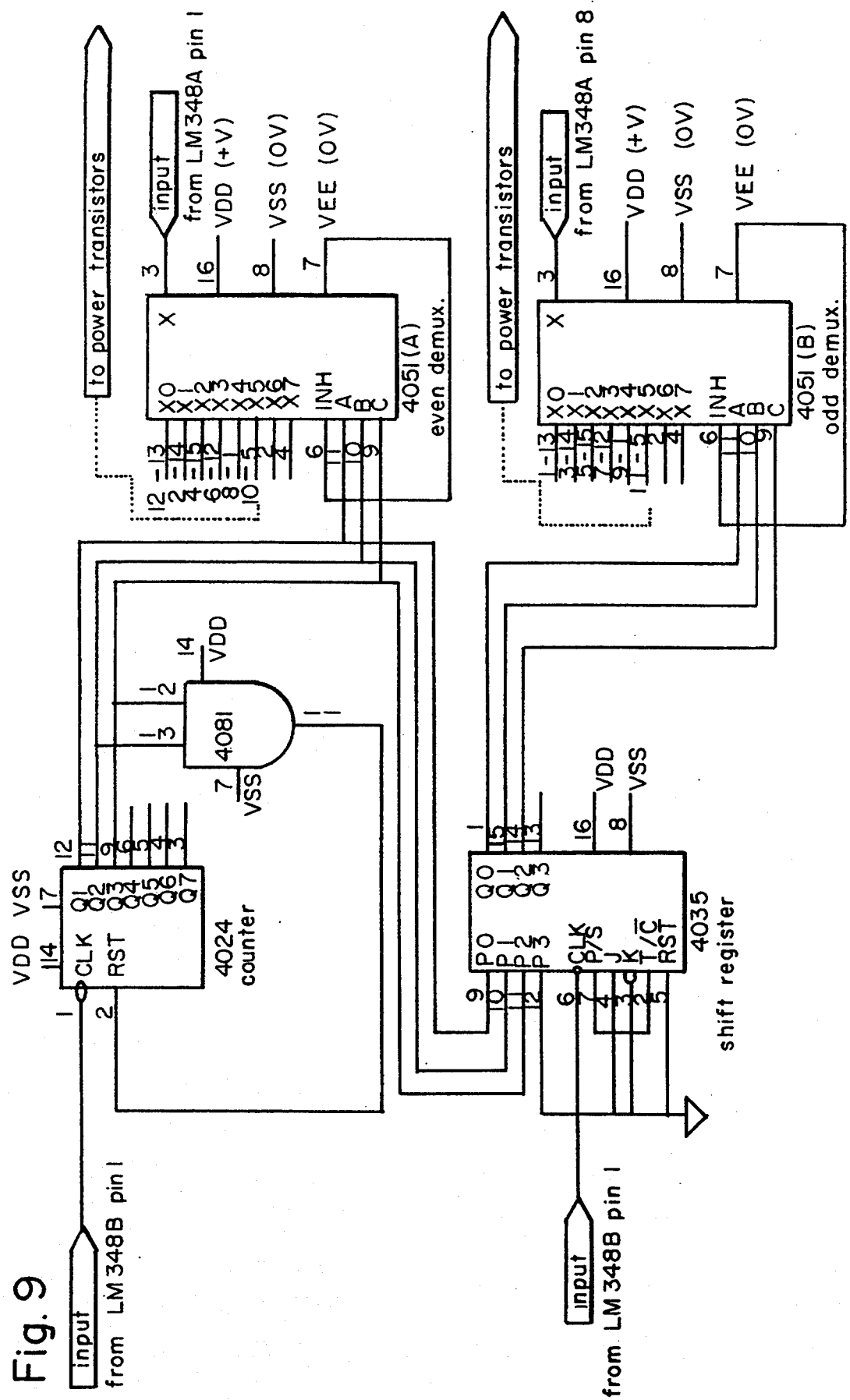
FIG. 9 is a schematic diagram of the digital portion of the control circuit of FIG. 7.

FIG. 6 graphically illustrates the above-tabulated coil currents. It is seen that the falling current in the first coil 12A and the rising current in the second coil 12B are nearly perfect straight lines. Thus, it is seen the triangular-shaped coil currents of FIG. 5 will produce nearly perfect sinusoidal AC output voltage.

More specifically, the following table lists the deviation from a perfect rotating field that results from using perfectly triangular-shaped coil currents:

| TIME Deg. | COIL 12A MMF P.U. | COIL 12B MMF P.U. | RESULT. FLUX | | FLUX ERROR | |
|---|---|---|---|---|---|---|
| | | | MAG. P.U. | AXIS Deg. | MAG % | AXIS Deg. |
| 0.0 | 1.0 | 0.0 | 1.0000 | 0.000 | 0.00 | 0.000 |
| 3.0 | 0.9 | 0.1 | 0.9879 | 2.901 | 1.21 | 0.099 |
| 6.0 | 0.8 | 0.2 | 0.9783 | 5.867 | 2.17 | 0.133 |
| 9.0 | 0.7 | 0.3 | 0.9715 | 8.882 | 2.85 | 0.118 |
| 12.0 | 0.6 | 0.4 | 0.9673 | 11.933 | 3.23 | 0.067 |
| 15.0 | 0.5 | 0.5 | 0.9659 | 15.000 | 3.41 | 0.000 |
| 18.0 | 0.4 | 0.6 | 0.9673 | 18.068 | 3.27 | 0.068 |
| 21.0 | 0.3 | 0.7 | 0.9715 | 21.117 | 2.85 | 0.117 |
| 24.0 | 0.2 | 0.8 | 0.9783 | 24.134 | 2.70 | 0.134 |
| 27.0 | 0.1 | 0.9 | 0.9879 | 27.098 | 1.21 | 0.098 |
| 30.0 | 0.0 | 1.0 | 1.0000 | 30.000 | 0.00 | 0.000 |

As can been seen from the foregoing table, the deviation amounts to less than 3.5% fluctuation.

Mesh-Connected DC Input Winding

Figure 10:
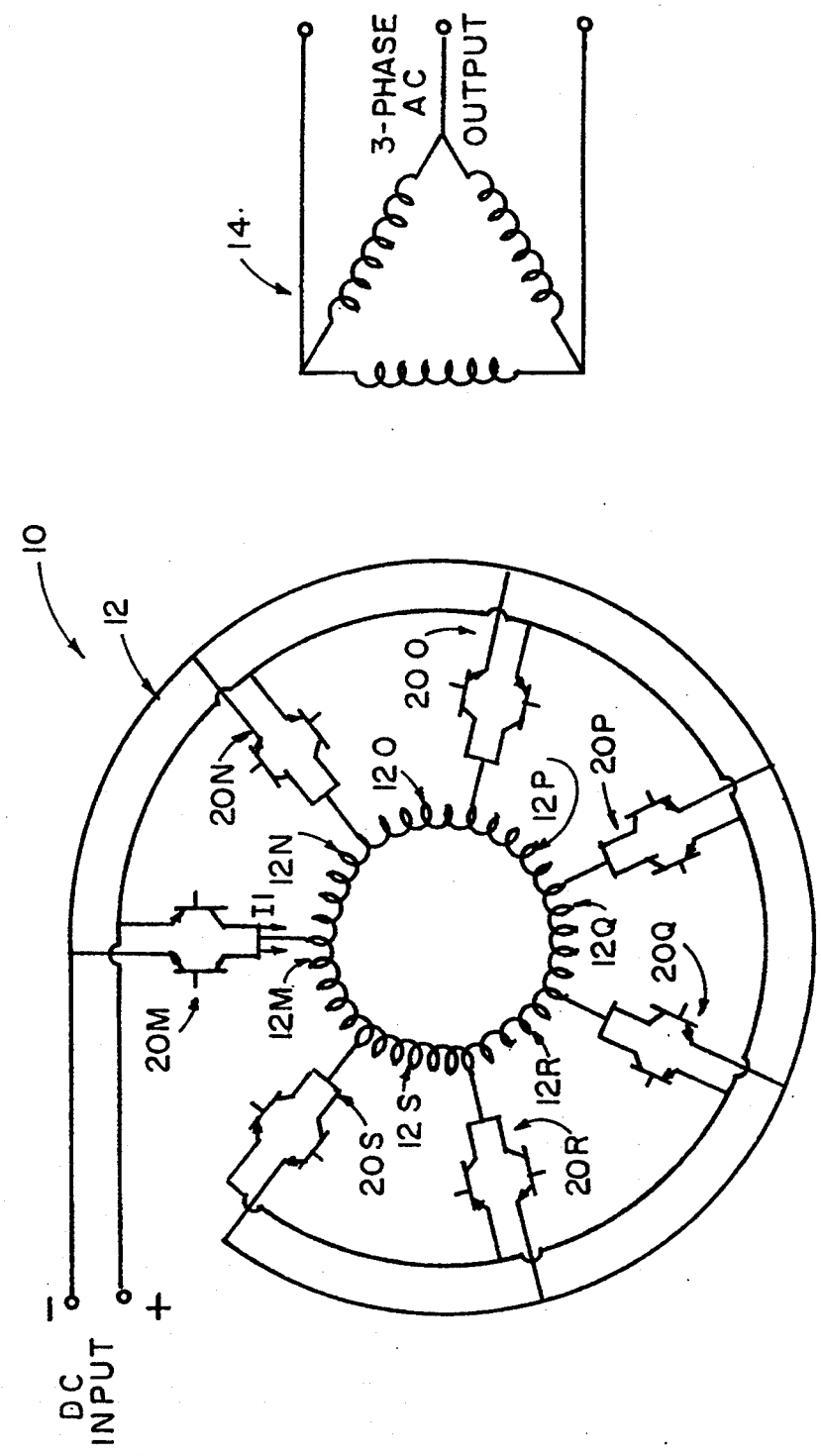
FIG. 10 is a schematic diagram of another embodiment of the electric power converter of the present invention having seven coils mesh-connected primary windings and three-phase delta-connected secondary windings.

As shown in FIG. 10, in its preferred embodiment, the DC input winding 12 comprises seven mesh-connected coils 12M–12S. Transistor pairs 20M–20S are respectively connected to the taps between the coils 12M–12S. Each transistor pair 20M–20S comprises reverse polarity transistor pairs connected to a positive bus and a negative bus to which the DC input is connected. All of the transistors of like polarity are controlled by a separate control circuit in the manner described below. For example, an NPN transistor is connected to the negative bus and a PNP transistor is connected to the positive bus. Likewise, when using MOS-FETs, the N channel should be connected to the negative bus and the P channel should be connected to the positive bus.

It is noted that in a mesh winding, like a DC machine with carbon brushes on a commutator, as the current is being transferred from one coil tap to the next, the coil between those taps undergoes a reversal of current direction. This results in an L di/dt voltage being developed across that coil and applied to the transistors 20M–20S. Hence, the reverse polarity transistor pairs 20M–20S are necessary. However, the mesh windings have the advantage that in the course of transferring the current from one tap to the next, the total magnetic field is significantly less disturbed. For example, in a twelve coil mesh-connected winding, the total magnetic field is disturbed only by one-fifth as much as the twelve coil star-connected winding.

Preferably, the mesh-connected winding 12 includes an odd number of taps so that there will be one ripple per transistor per cycle rather than one ripple per transistor pair that would occur with an even number of taps (i.e. diametrically opposing transistors turning ON at the same time).

For optimum sine wave output, the flux magnitude and rotational velocity of the magnetic field should be perfectly constant. To achieve this condition, the current fed into the stator should have the following functional form.

When conducting current from the positive DC bus to the stator, the current designated I1 in FIG. 10 should be:

$$I1 = I_{Max}\text{Sin}\left(\omega t - \frac{N_{start} - 1}{2} \cdot \alpha_R\right)/\sin(\alpha_R)$$

for $$\left[\frac{N_{Total}}{2} + 1\right]/2$$

units of angle, then $$I1 = I_{Max}\text{Sin}\left(\frac{N_{start} + 3}{2}\alpha_R - \omega t\right)\text{Sin}(\alpha_R)$$

for a like number of units of angle. When a branch conducts current from the stator to the negative DC bus, the corresponding equations for the current shape should be:

$$I1 = -I_{Max}\text{Sin}\left(\omega t - \frac{N_{start} - 1}{2}\alpha_R\right)/\text{Sin}(\alpha_R)$$

followed by $$I1 = -I_{Max}\text{Sin}\left(\frac{N_{Start} + 3}{2}\alpha_R - \omega t\right)/\text{Sin}(\alpha_R)$$

where $$N_{Total} = 2N_{coils}$$

and $N_{start}$ is the subdivision of the period in which node #2 first conducts current where there are $N_{Total}$ subdivisions. The other node currents are merely phase shifted versions of this current where the phase shift is an appropriate integral multiple of $\alpha_R$ increments.

Figure 12:
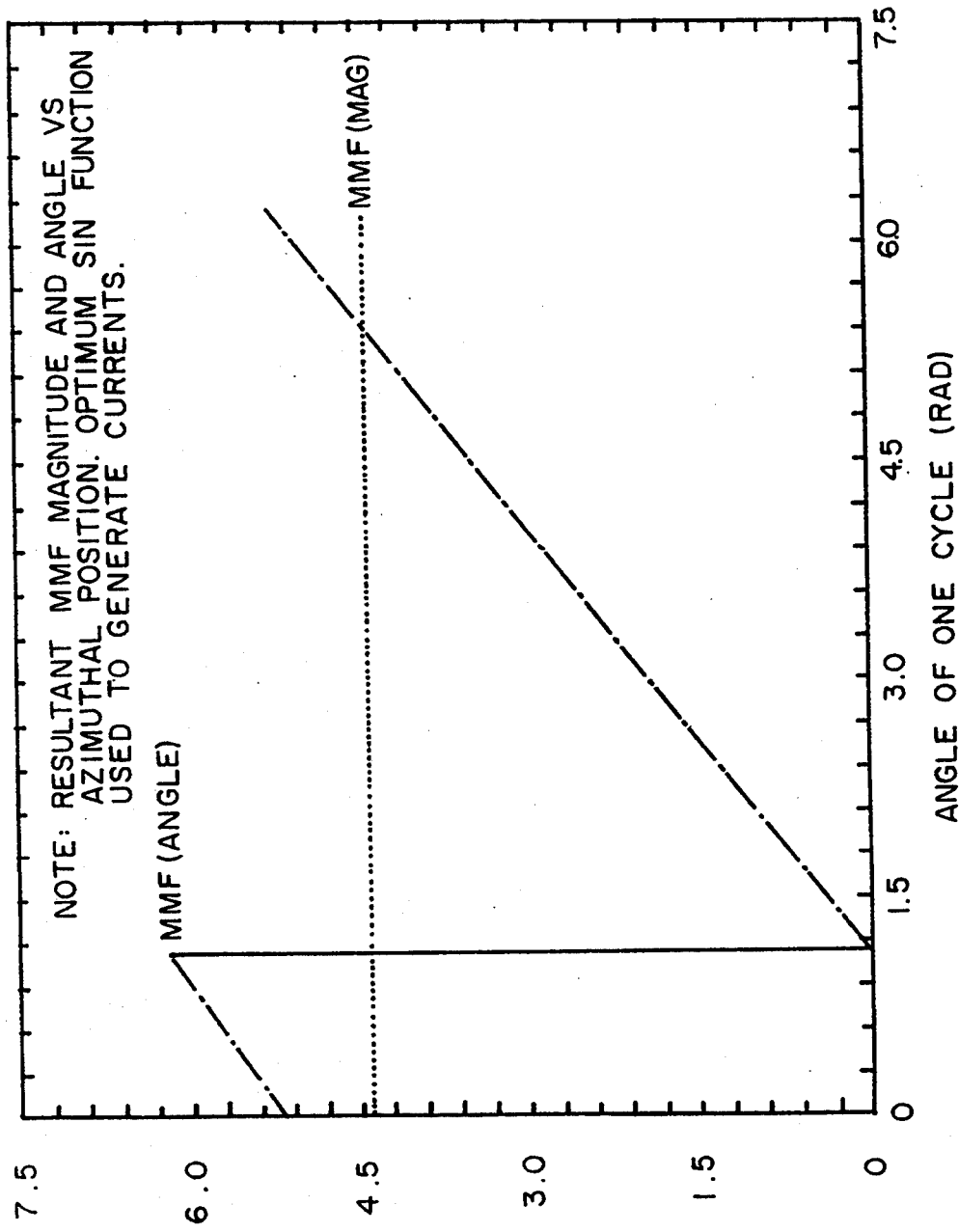
FIGS. 12, 13 and 14 are graphs illustrating the result MMF magnitude and angle, node currents and coil currents as a function of WT for the seven coil mesh-connector inverter of FIG. 10 operated with the optimum sine function node currents.
Figure 13:
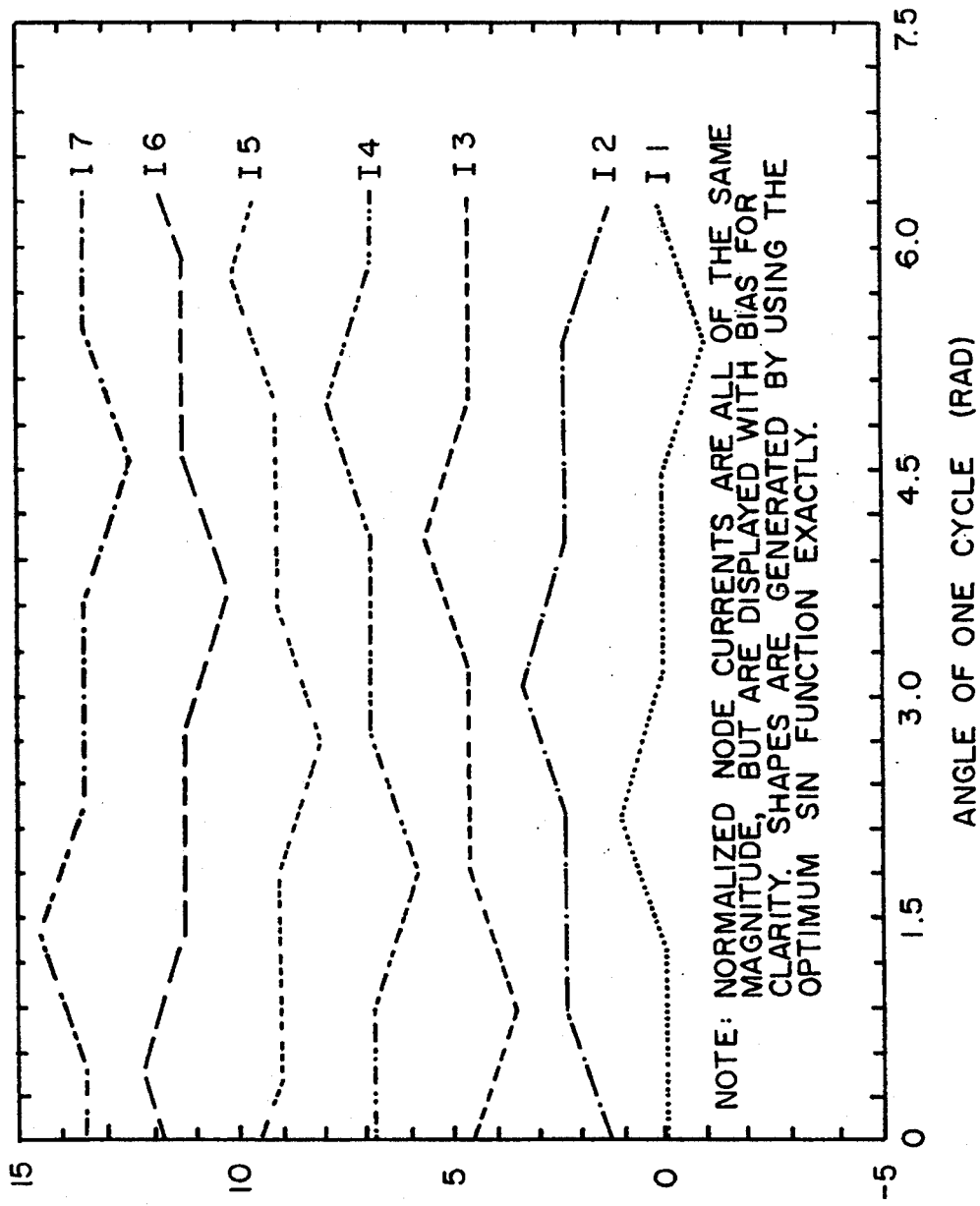
Figure 14:
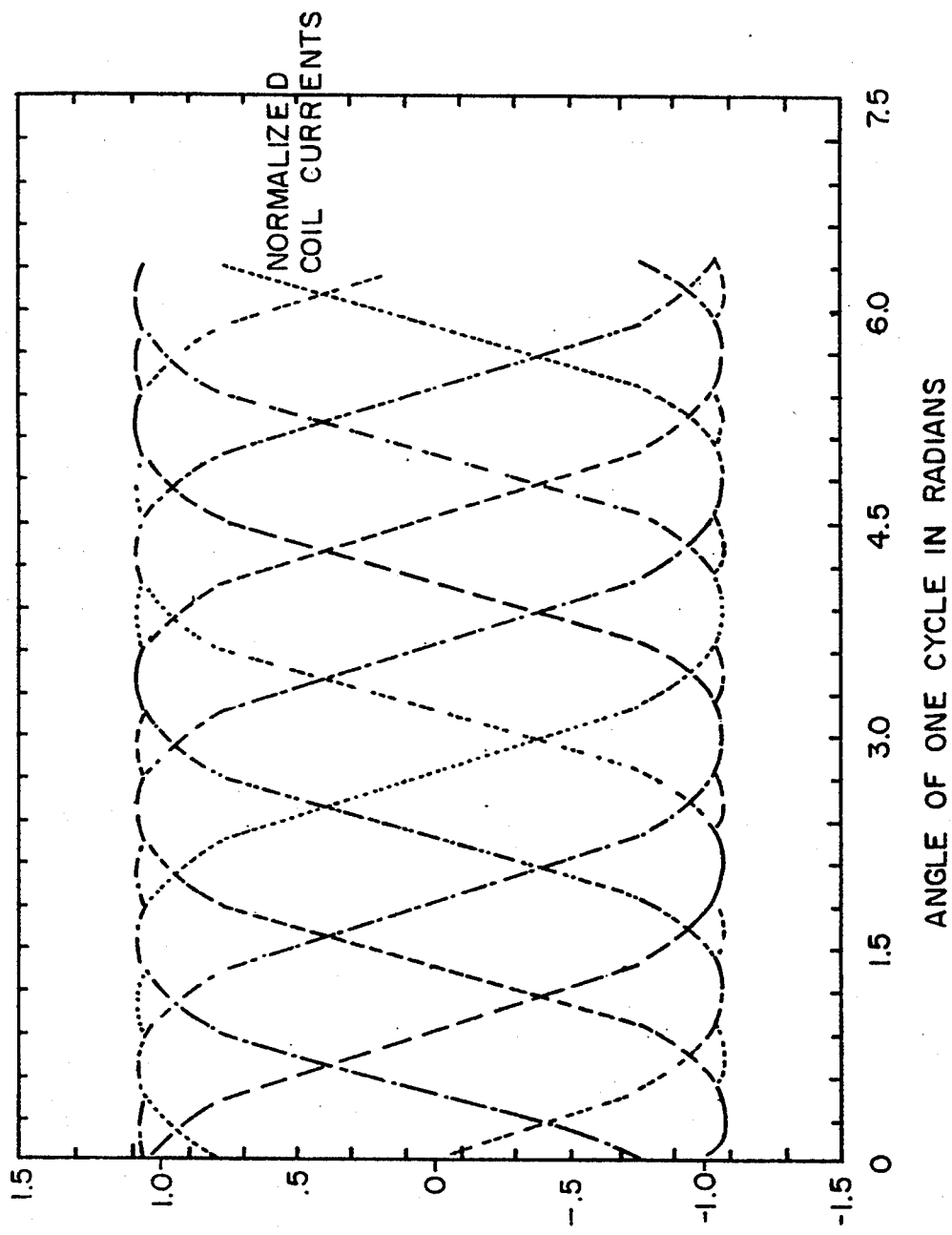
Figure 15:
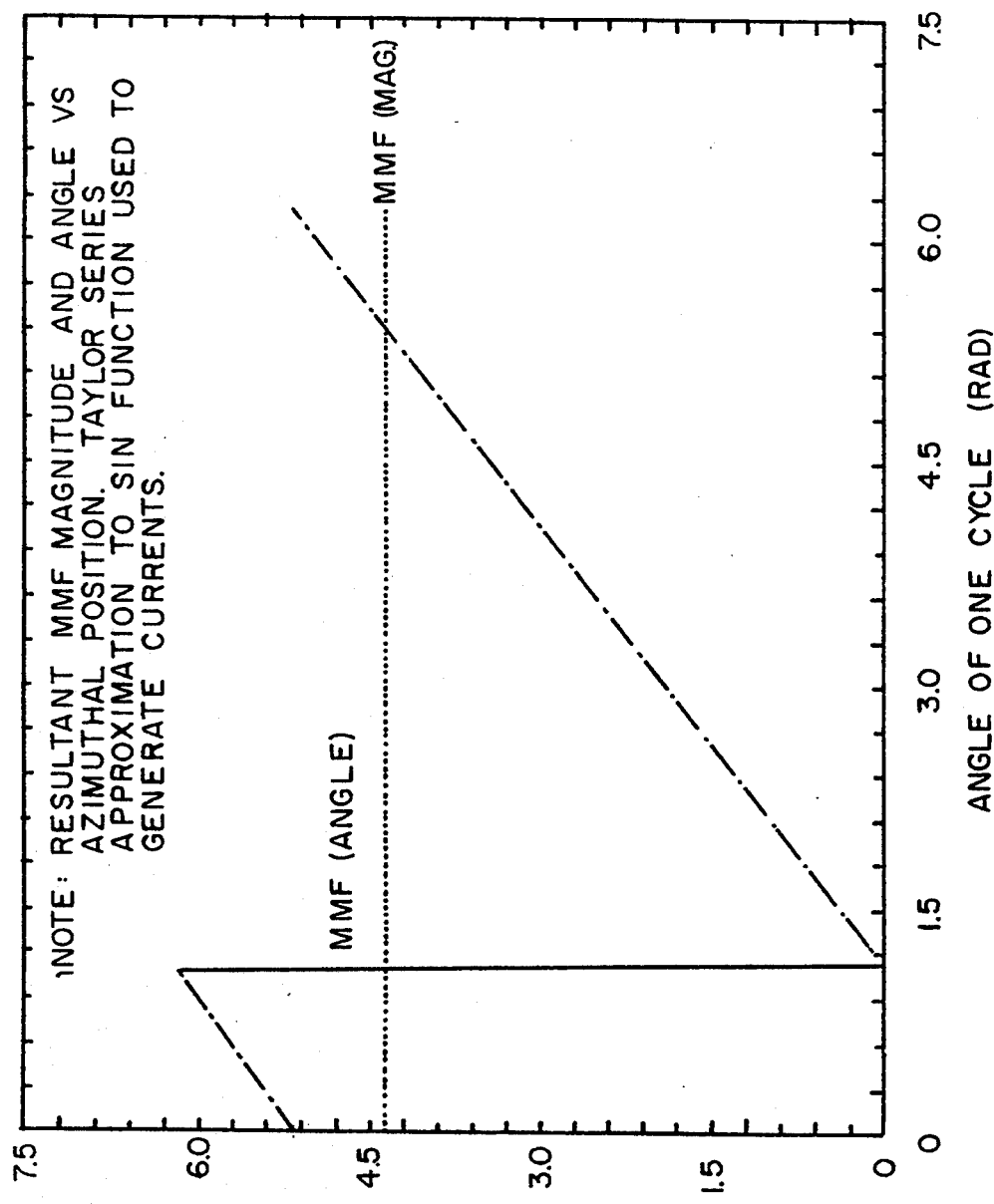
FIGS. 15, 16 and 17 are graphs illustrating the result MMF magnitude and angle, node currents and coil currents as a function of WT when the first two terms of a Taylor series expansion for the time varying sine function of its argument are employed.
Figure 16:
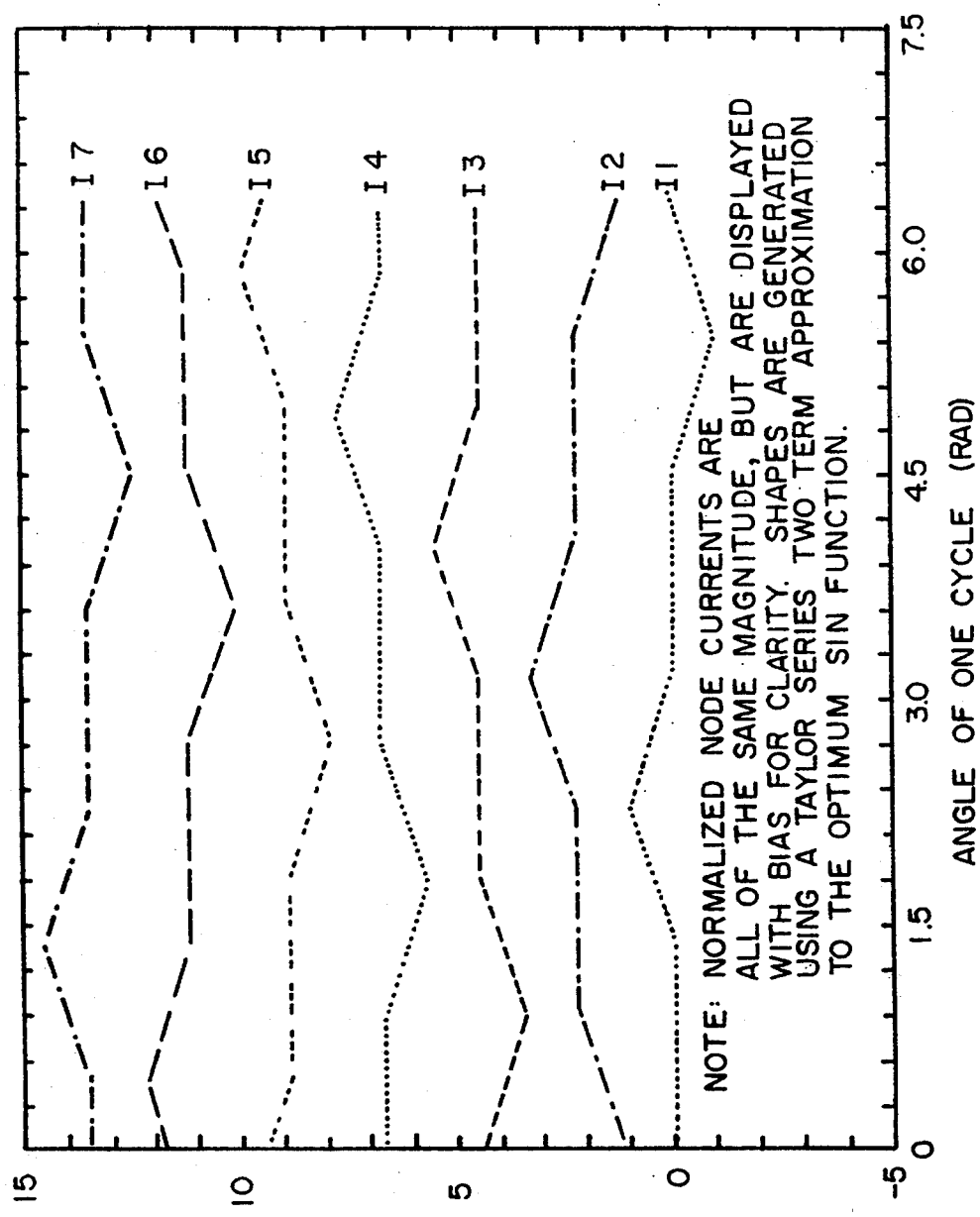
Figure 17:
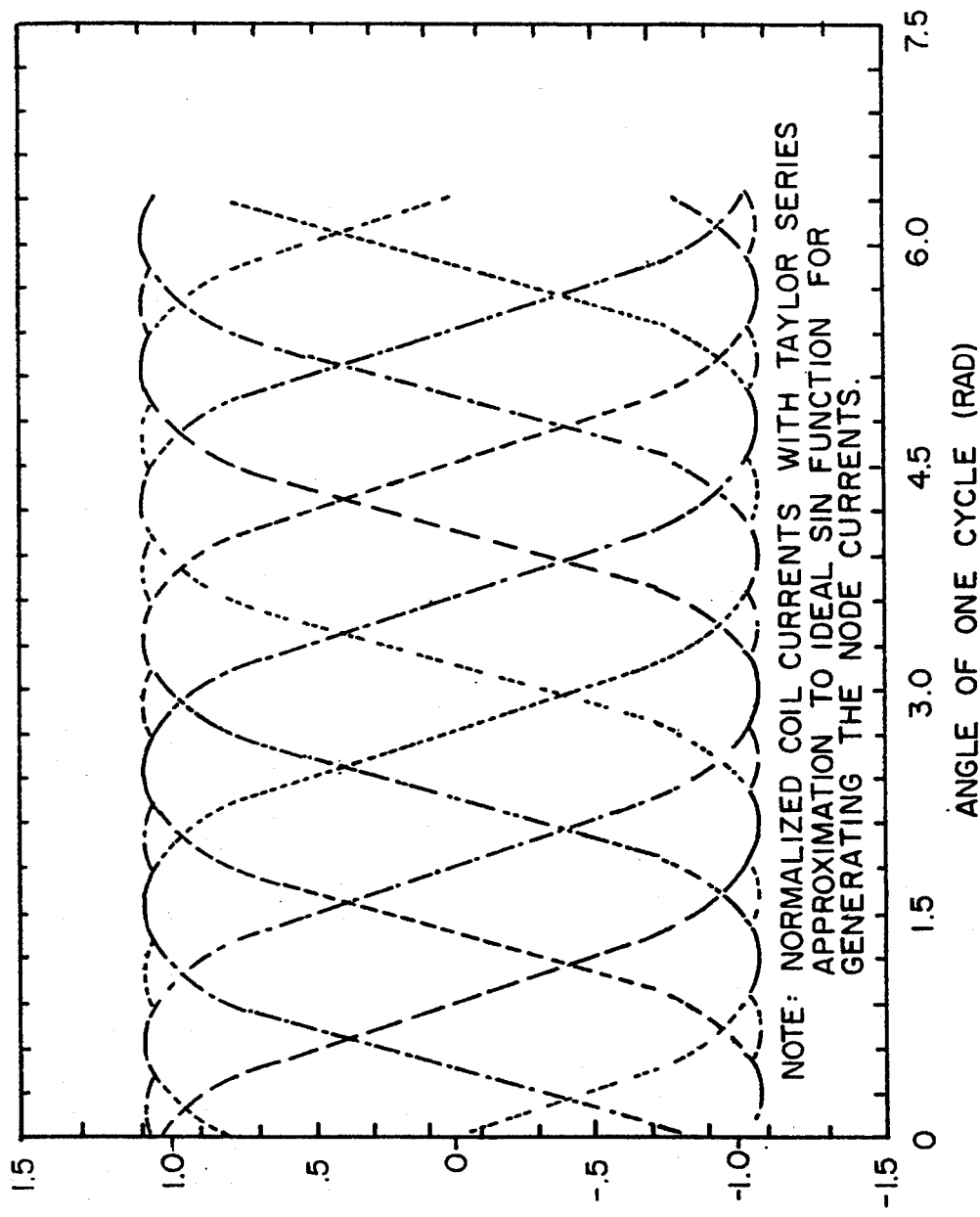
Figure 18:
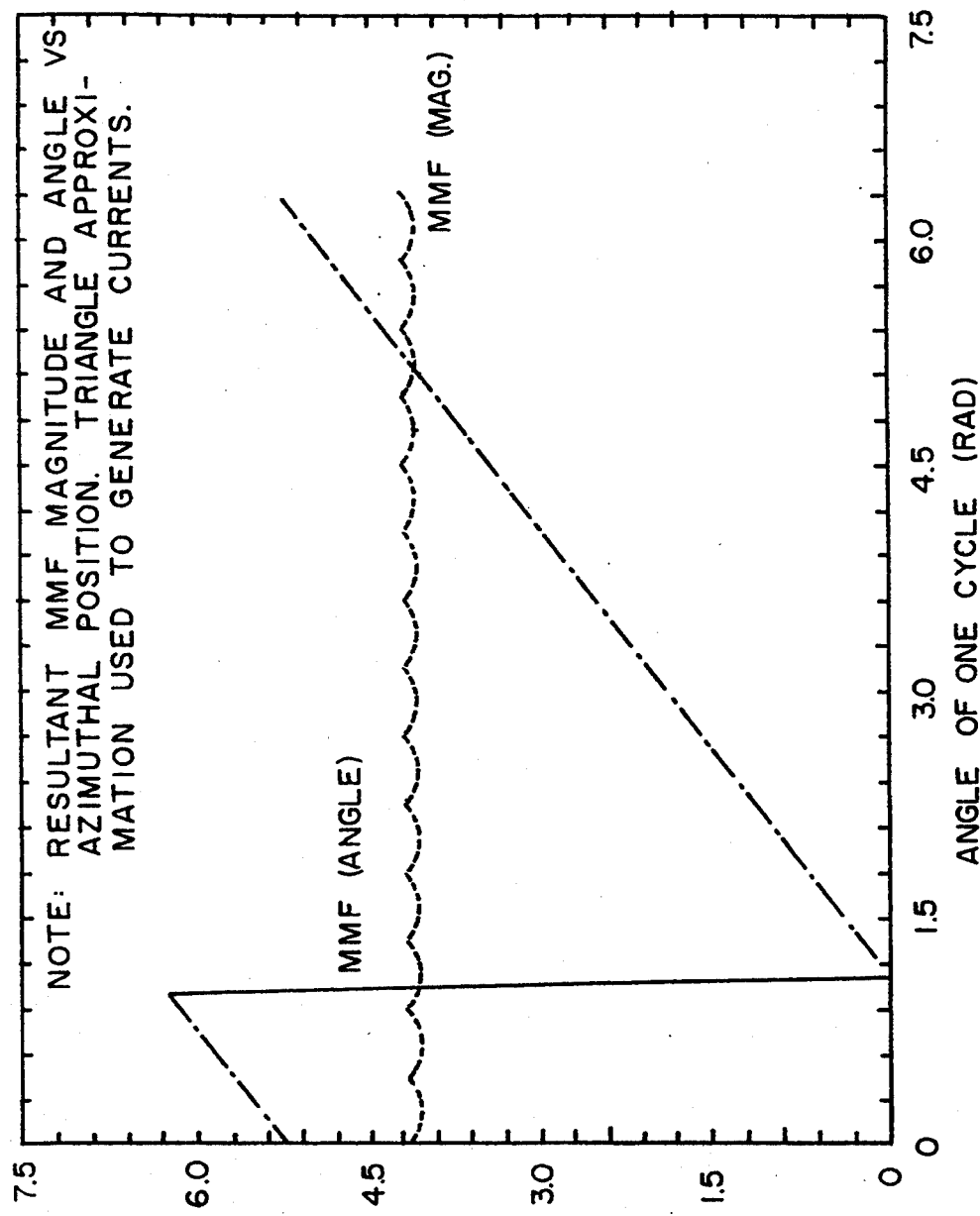
FIGS. 18, 19 and 20 are graphs illustrating the result MMF magnitude and angle, node currents and coil currents as a function of WT when triangular-shaped current approximation is employed.
Figure 19:
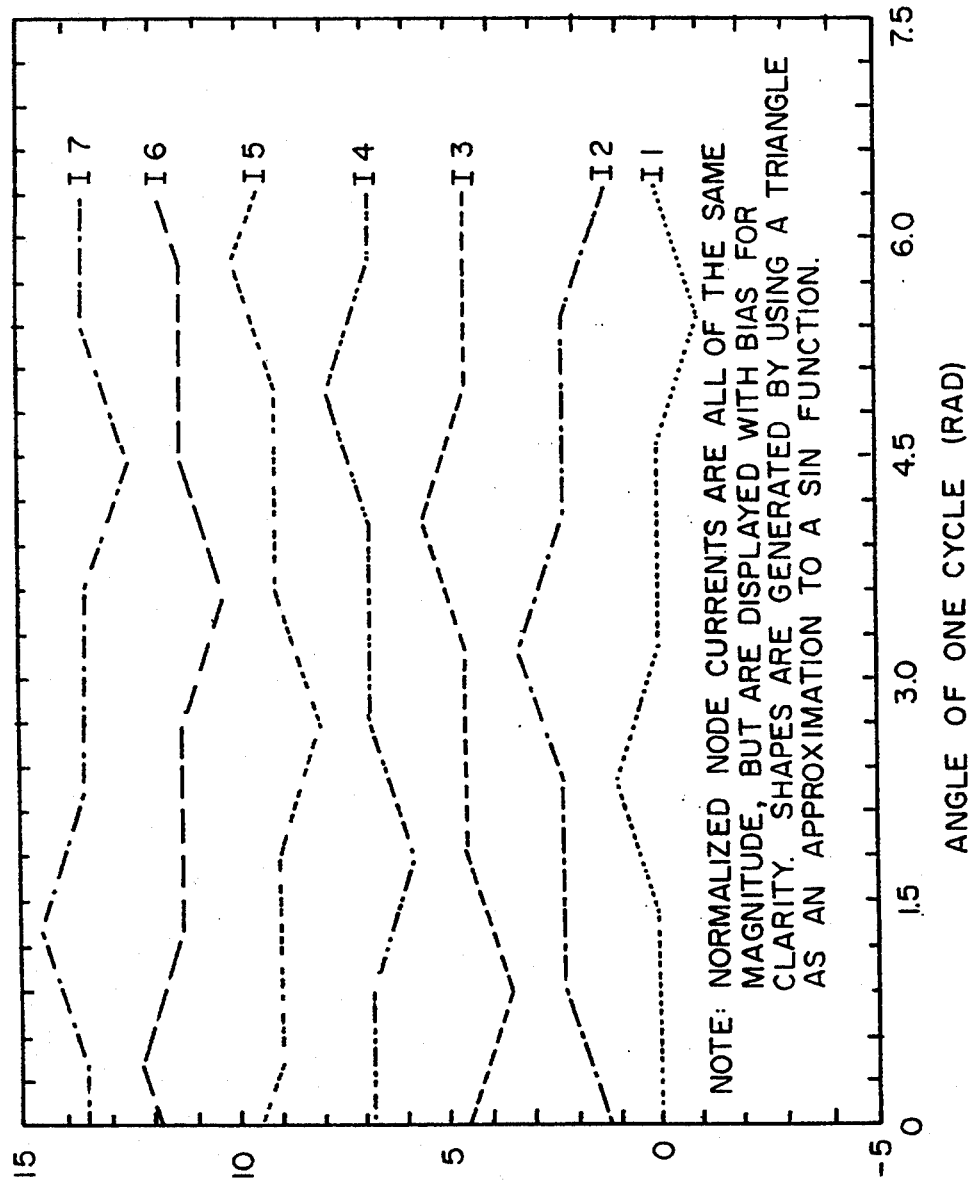
Figure 20:
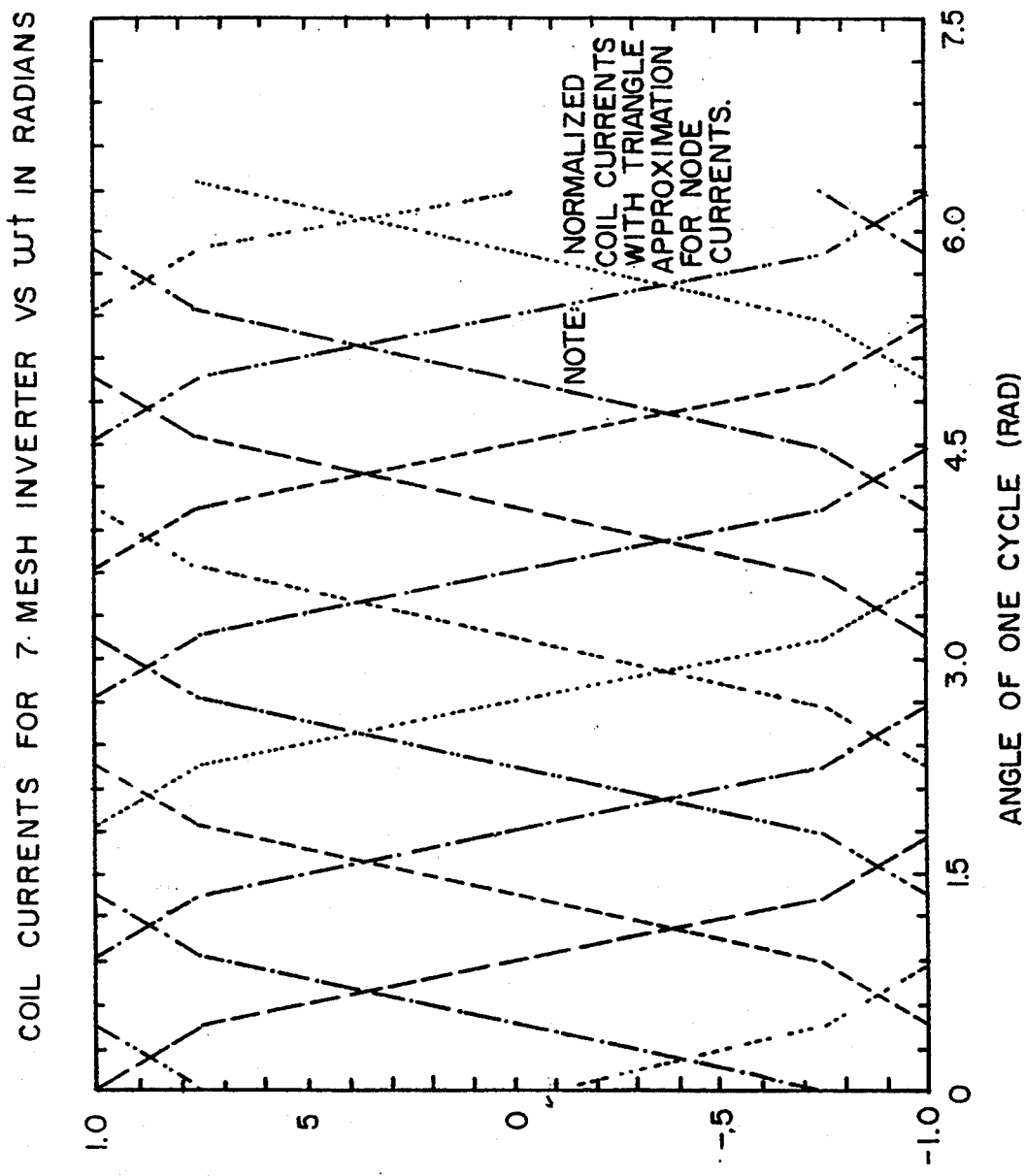

FIGS. 12, 13 and 14 illustrate the resultant MMF magnitude and angle, normalized node currents and coil currents as a function of $\omega t$ for the seven coil mesh-connected inverter of FIG. 10 operated with the optimum sine function node currents. FIGS. 15, 16 and 17 illustrate the resultant MMF magnitude and angle, normalized node currents and coil currents as a function of $\omega t$ when the first two terms of a Taylor series expansion for the time varying sine function of its argument are employed. And FIGS. 18, 19 and 20 illustrate the resultant MMF magnitude and angle, normalized node currents and coil currents as a function of $\omega t$ when triangular-shaped current approximation is employed.

Analog/Digital Control Circuit

Figure 11:
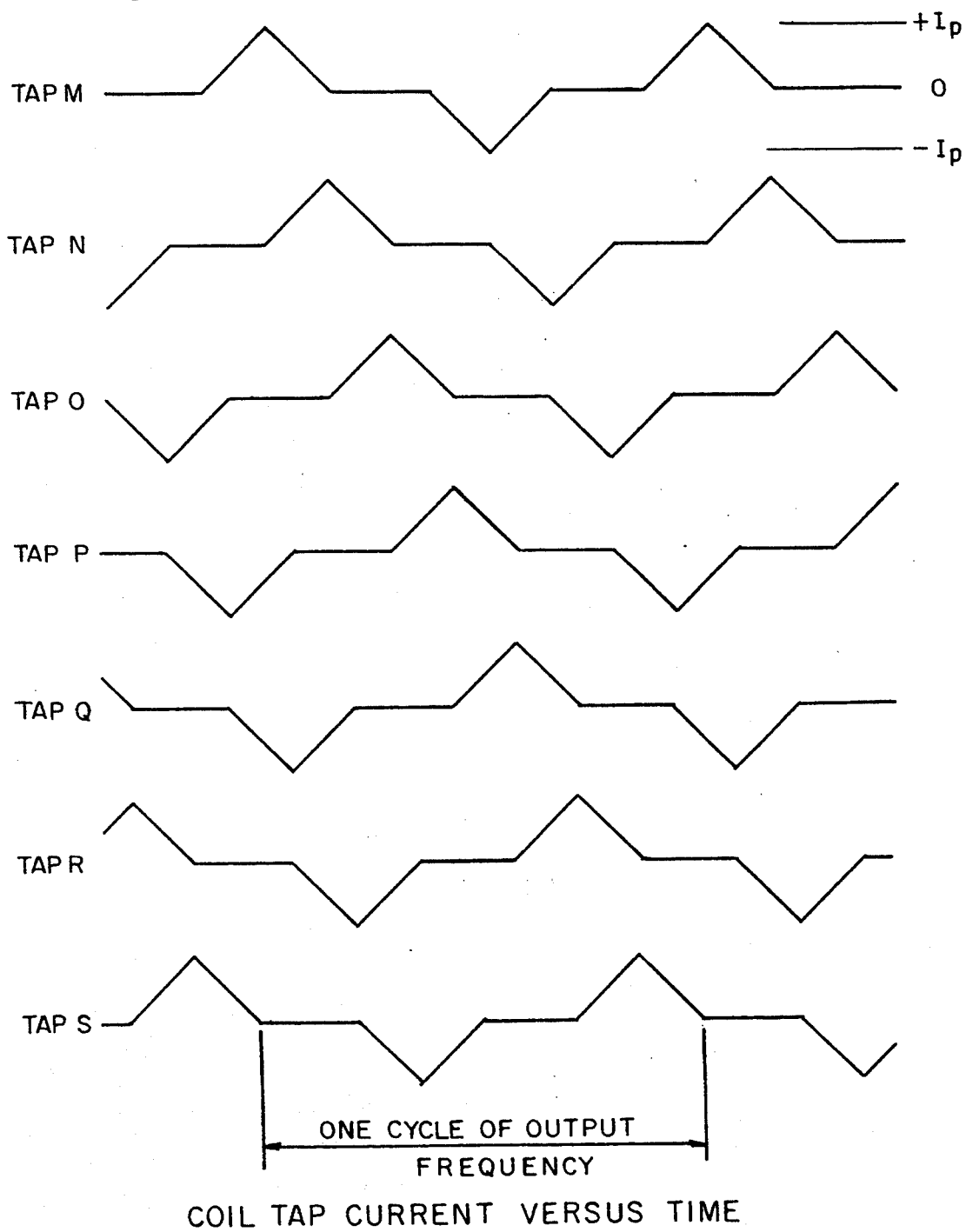
FIG. 11 is a timing diagram illustrating the triangular-shaped currents of the coil taps.

As shown in FIGS. 21–24, the control circuit that drives the 14 transistors of FIG. 10 comprises an analog portion and a digital portion which produces the triangular-shaped waveforms as shown in the timing diagram of FIG. 11. It is noted that the digital portion of the control circuit serves only to provide timing signal to the four demux chips used to distribute base current drive signals. Hence, the analog portion of the control circuit is described first and then the digital circuit is described.

Figure 21:
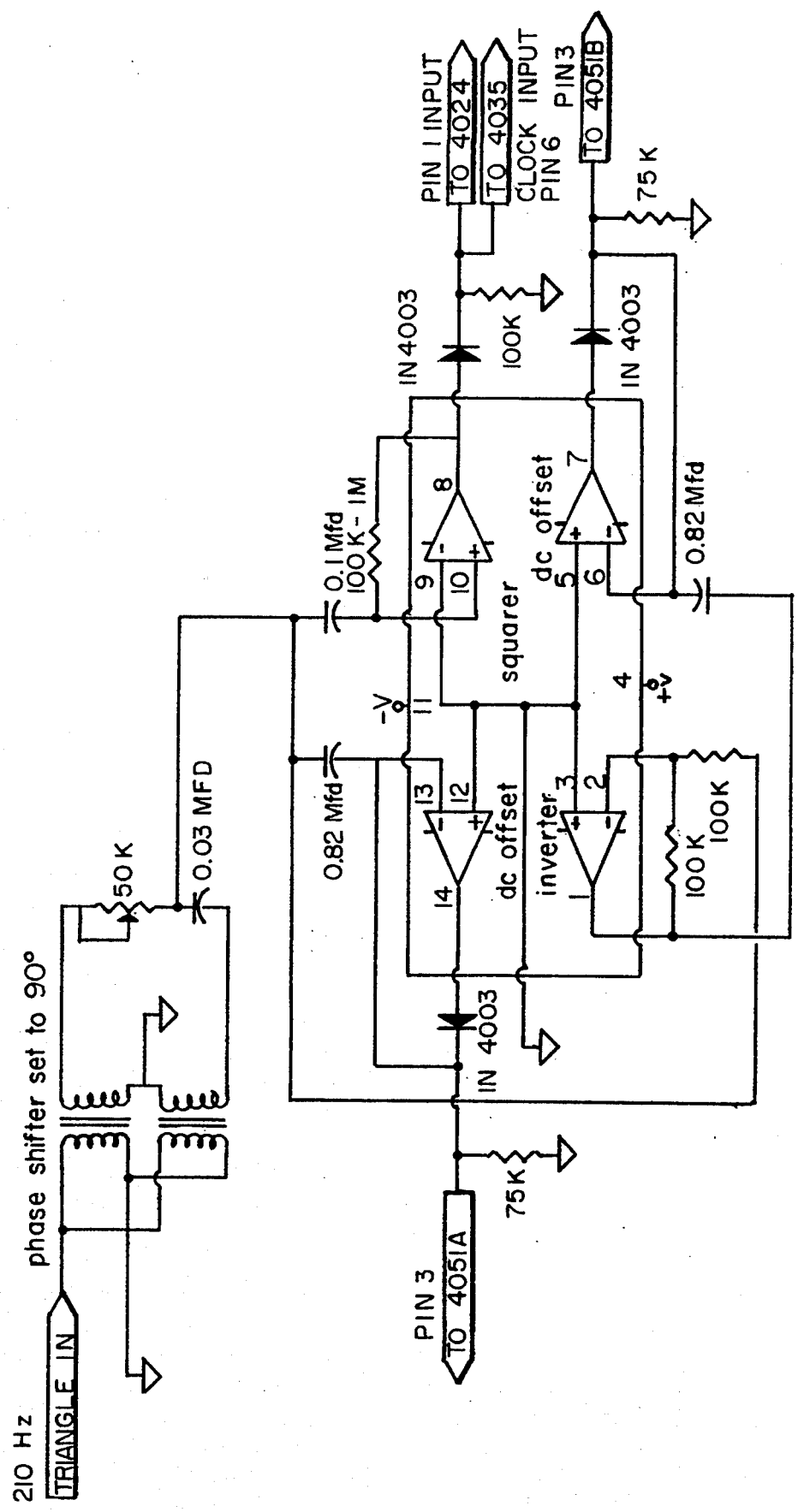
FIG. 21 is a schematic diagram illustrating the analog portion of the control circuit for producing the desired triangular-shaped timing wave forms of FIG. 11.
Figure 22:
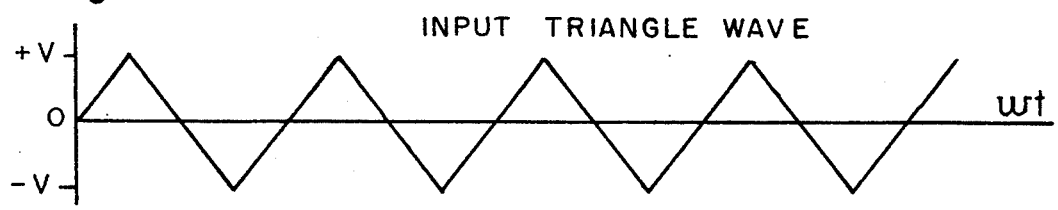
FIG. 22 is a diagram of a reference triangular wave.

As shown in FIGS. 21 and 22, a reference triangle wave is generated by an oscillator with a frequency $f_{osc} = f_{output}(N_{coils}/2)$ With standard 60 hertz and a seven coil primary, 210 hertz is obtained from the oscillator.

As noted above, control circuits must be provided for each of the like polarity transistors. Hence, there is a dual control circuit, one for the NPN transistors connected to the negative DC bus and another for the PNP transistors connected to the positive bus. The operation of the dual control circuits is essentially the same with the exception that the control circuit for the negative DC bus is phase shifted 90 electrical degrees as 210 hertz from the positive control circuit. Also, the polarity is reversed since PNP transistors are employed. With this understanding, the following only describes the control circuit for the positive bus.

Figure 23A:
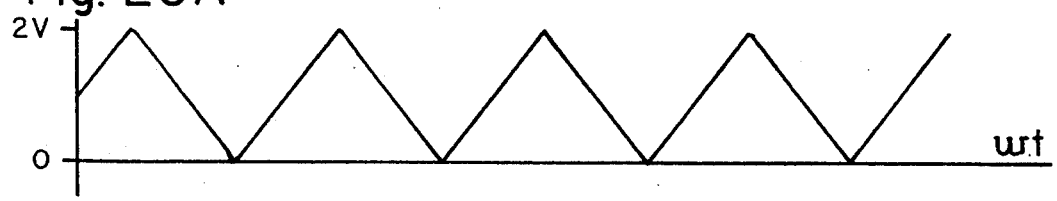
FIGS. 23A-D are diagrams of the output wave forms of the analog portion of the control circuit.
Figure 23B:
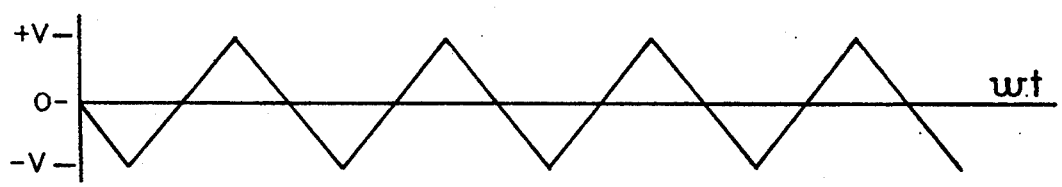
Figure 23C:
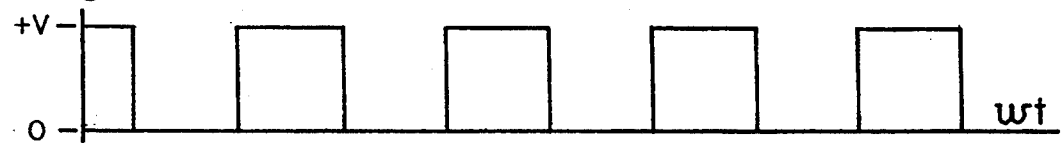
Figure 23D:
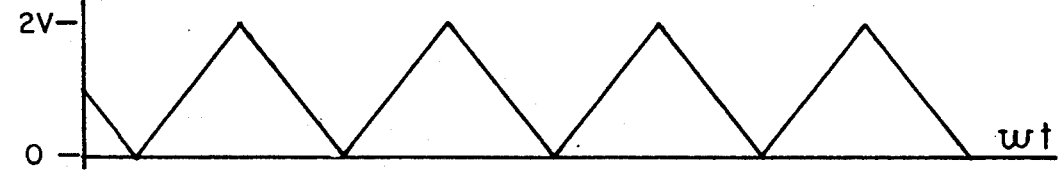

Referring now to FIGS. 21 and 23A–23D, it is seen that the input triangle of FIG. 22 is input to three separate linear operational amplifiers to provide the four waveforms of FIGS. 23A–23D. Specifically, 23A illustrates an input triangle wave with a DC offset so that it will always be above ground; FIG. 23D illustrates the inversion of the input triangle wave to produce a new triangle wave 180 electrical degrees out of phase from the reference triangle wave of FIG. 22; FIG. 23C illustrates the derivative of the input triangular wave which is a square with a positive transition when the triangle begins a positive slope and a negative transition when the slope changes to a negative; and FIG. 23D illustrates the output of the op amp inverter pass through another operational amplifier to produce an offset pulse train.

Figure 24:
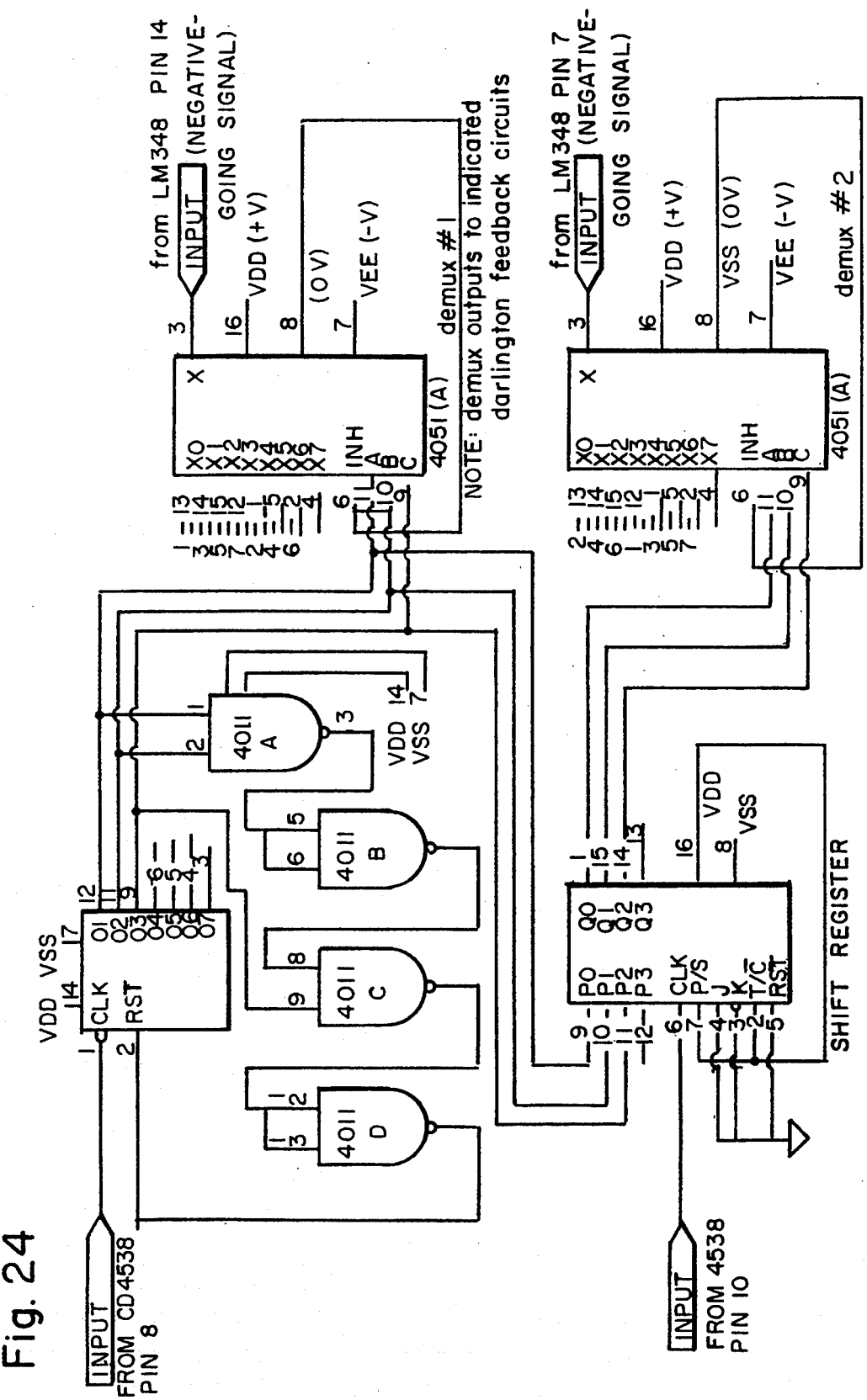
FIG. 24 is a schematic diagram of the digital portion of the control circuit.

Referring now to FIG. 24, the digital portion of the control circuit comprises a pair of demultiplexers (demuxs), each of which having eight outputs; however, only seven of which are used to drive the bases of transistors. It is noted that the waveforms illustrated in FIG. 23A is fed into the input of demux #1 and the waveform illustrated in FIG. 23D is fed into the input of demux #2.

The demux steer the input to a particular output line at the command of a three bit control word. A digital network is therefore needed to count pulses and provide the address signals to the demux control line. With this purpose, a counter and shift register are employed. The counter is reset after counting up to seven. The three outputs of the counter provide direct control to demux #1 and also the input line to a shift register which give the ninety degree phase shift needed to drive demux #2. The counter triggers on a positive transition of the clock pulse while the shift register triggers on a falling pulse. Therefore, a single a square wave generated by the analog differentiator (FIG. 23C) is sufficient to provide clocks for both the counter and the shift register.

Circuit Control Feedback Circuit

Experimentation with both the star-connected and the mesh-connected revealed that while the transistors were being fed the desired triangular-shaped phase current, the emitter current did not have the same shape as the phase current due to the non-linear response of the transistors. Optimally, the transistors should behave as a linear amplifier of-the input base signal since any added distortion caused by non-linearity in the power stage is translated to the output of the inverter as a distortion to the desired sine wave output.

Figure 25:
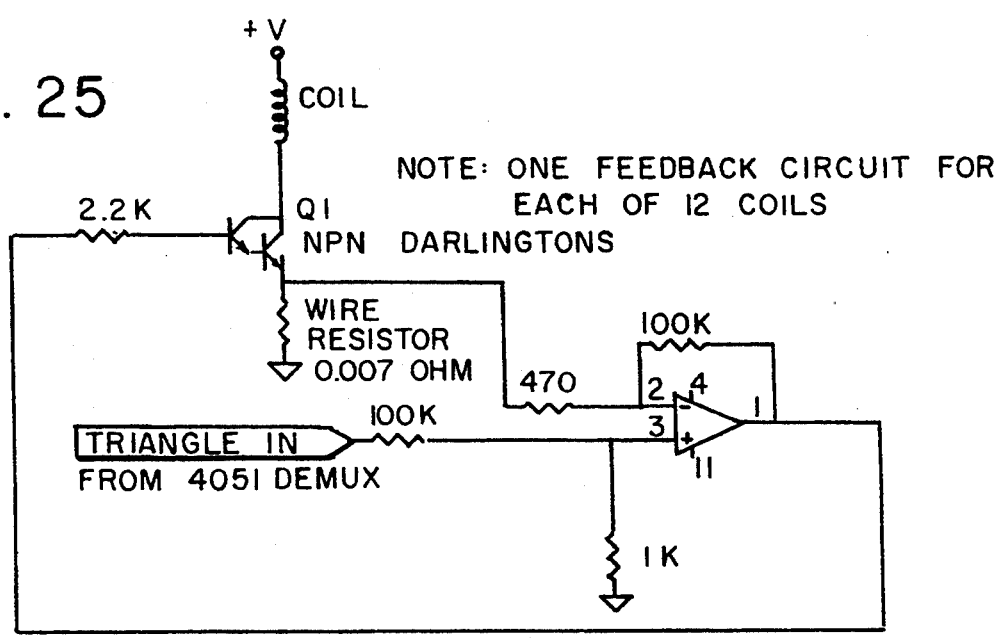
FIG. 25 is a schematic diagram illustrating the current control feedback circuit of the control circuit.

To remove the effect of the power amplifier as a source of distortion, a conventional feedback technique may be employed to force the emitter current to be a faithful amplification of the base drive signal. As shown in FIG. 25, the reference current generated in the control circuit of the correct triangular-shape is fed into the non-inverting input of an operational amplifier. A small resistance (usually just a piece of wire) is connected in series with the emitter of the transistors so as to generate a signal that is proportional to the actual emitter output current. The output signal is then fed into the inverting input of the operational amplifier. The operational amplifier therefore acts as a differential summing amplifier which compares the reference signal with the output feedback signal and produces an error signal that is an amplified version of the referenced signal minus the feedback signal. The amplified error signal is fed into the base of the respective transistors to drive the coils to produce the desired AC output.

Pulse Width Modulation Control Circuit

In the context of the present invention, a pulse width modulation (PWM) control circuit may alternatively be used for generation of triangular-shaped coil or node currents needed to drive the inverter to generate sinusoidal AC output waveforms. The primary method discussed above has been the linear control of current from a DC voltage source. For any input voltage the current in a resistor/inductor loop is described by:

$$V(t) = i(t)*R + L\frac{d(i(t))}{dt}$$

Figure 26:
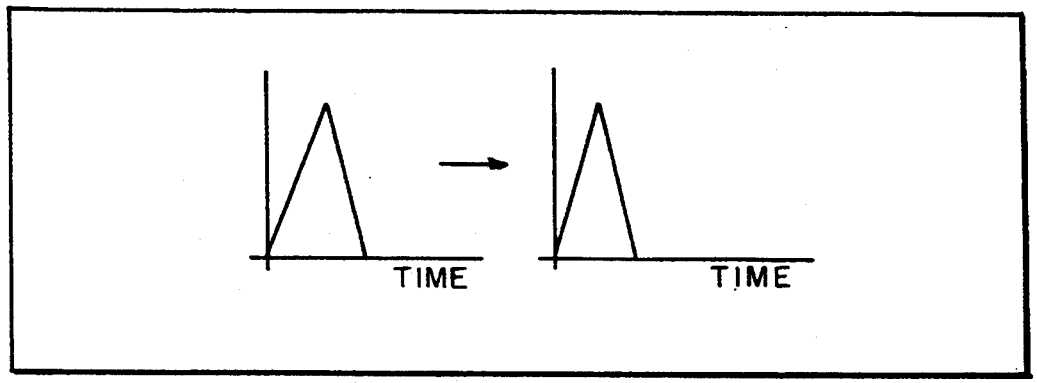
FIG. 26 is a graph of the voltage and current versus time of the pulse width modulation (PWM) control circuit.
Figure 27:
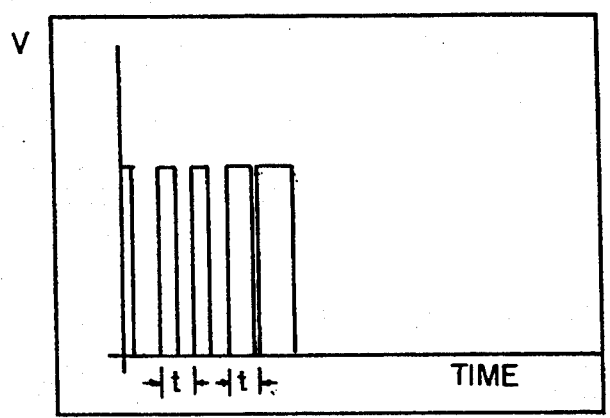
FIG. 27 is a graph of the PWM voltage waveform.

If $$L\frac{d(i(t))}{dt} < i(t)*R$$

then $$V(t) \approx i(t)*R \rightarrow i(t) \approx \frac{V(t)}{R}$$

and the current will approximately follow the voltage wave shape as indicated in FIG. 26. In this technique, with minor feedback corrections, the triangular shaped current wave is generated through the coil.

DC MOTOR

It is noted that the DC windings may be located on the outer core or stator and then controlled with the above-described control circuit so as to produce the rotating magnetic field. A DC induction motor is created by positioning a motor rotor in the stator. The rotor may be a squirrel cage rotor, a wound rotor, a permanent magnet rotor, an electromagnetic rotor, a salient pole rotor, a reluctance rotor or the like. The motor will therefore operate as an ordinary motor with that particular type of rotor. The frequency of the triangular-shaped currents applied to the DC winding on the stator may be varied to thereby vary the speed of the motor. It is noted that a motor of this type that operates on direct current has the ruggedness and low maintenance of the squirrel cage induction motor. The motor speed can be adjusted by simply varying the frequency of the control circuit. There are no torque pulsations in this motor as there otherwise exists in all other solid state AC motor drives.

STATIC SYNCHRONOUS CONDENSER

A synchronous condenser with no moving parts may be constructed by utilizing the above-referenced techniques to produce a rotating magnetic field that is applied to the field of a synchronous condenser. The rotor will no longer rotate, but will be fixed to carry a multicoil winding controlled by one of the methods described above. Adjusting the strength of the magnetic field will vary the value of reactance that the condenser presents to the distribution system to which it is connected. With no moving parts, the condenser may be immersed in oil to improve its electrical insulation and also its cooling capability. The KVAR rating of the condenser will therefore substantially increase. Even though there are no moving parts in this improved condenser, the air gap should not be reduced to zero because the air gap establishes a large exciting current that produces the large lagging KVAR capacity. However, if the lagging KVAR capacity is not needed, the air gap could be reduced or eliminated. Then, the leading KVARs can be obtained with a smaller field from the DC windings. It is believed that this synchronous condenser will have a greater KVAR rating for the same size and without any moving parts, thereby reducing maintenance and eliminating the need of hydrogen cooling.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A method for inverting direct current electrical power into alternating current electrical power, comprising the steps of:

producing a moving magnetic field having substantially constant flux density when the direct current power is applied to a primary winding;

magnetically coupling a secondary winding to the moving magnetic field; and creating a substantially triangular-shaped current in each phase of the primary winding so as to produce substantially sinusoidal alternating current in each phase of the secondary winding.

2. The method as set forth in claim 1, wherein the step of creating a substantially triangular-shaped current in each phase of the primary winding comprises the step of creating a perfect triangular-shaped current in each phase of the primary winding so as to produce substantially sinusoidal alternating current each phase of the secondary winding, whereby the direct current is perfectly uniformly consumed.

3. The method as set forth in claim 1, wherein the step of creating a substantially triangular-shaped current in each phase of the primary winding comprises the step of creating a substantially triangular-shaped current in each phase of the primary winding so as to produce perfectly sinusoidal alternating current each phase of the secondary winding, whereby the direct current is not perfectly uniformly consumed.

4. The method as set forth in claim 1, wherein the primary winding comprises a polyphase primary winding.

5. The method as set forth in claim 4, wherein the secondary winding comprises a polyphase secondary winding.

6. The method as set forth in claim 5, wherein the step of creating a substantially triangular-shaped current in each phase of the primary winding comprises the step of operating a linear gate means connected to each phase of the primary winding to create the substantially triangular-shaped current in each phase of the primary winding.

7. The method as set forth in claim 6, wherein the step of operating a linear gate means connected to each phase of the primary winding comprises the step of operating the linear gate means connected to each phase of the primary winding by means of a substantially triangular-shaped base current supplied to the base of each of the linear gate means.

8. The method as set forth in claim 7, wherein the step of operating the linear gate means connected to each phase of the primary winding comprises the step of supplying a substantially triangular-shaped base current supplied to the base of each of the linear gate means, with the phases of the primary winding being star-connected.

9. The method as set forth in claim 8, wherein the step of supplying a substantially triangular-shaped base current to the base of each of the linear gate means comprises the step of supplying a substantially triangular-shaped base current to the base of each of the linear gate means, with the base current in one linear gate means overlapping in time the base current in an adjacent linear gate means.

10. The method as set forth in claim 9, wherein the step of supplying a substantially triangular-shaped base current to the base of each of the linear gate means, with the base current in one linear gate means overlapping in time the current in an adjacent linear gate means, further includes the step of supplying the base current of a linear gate means to one terminal of a differential summing amplifier and supplying a signal representative of the current in that phase to another terminal of the differential summing amplifier and then supplying an error signal to the base of the linear gate means, thereby assuring that the linear gate means linearly amplifies the base current.

11. The method as set forth in claim 7, wherein the step of operating the linear gate means connected to each phase of the primary winding comprises the step of supplying a substantially triangular-shaped base current supplied to the base of each of the linear gate means, with the phases of the primary winding being mesh-connected, with a pair of oppositely polarized linear gate means being provided for each phase, and with all of the positive polarized linear gate means being connected to a positive bus and all of the negative polarized linear gate means being connected to a negative bus.

12. The method as set forth in claim 11, wherein the phases of the primary comprises an odd number of phases.

13. The method as set forth in claim 11, wherein the phases of the primary comprises an even number of phases.

14. The method as set forth in claim 11, wherein the step of supplying a substantially triangular-shaped base current supplied to the base of each of the linear gate means comprises the step of supplying oppositely polarized substantially triangular-shaped base current to the base of each of the oppositely polarized linear gate means, with the base current in one linear gate means of one polarity overlapping in time the current in an adjacent linear gate means of the same polarity.

15. The method as set forth in claim 14, wherein the step of supplying a substantially triangular-shaped base current to the base of each of the linear gate means, with the base current in one linear gate means overlapping in time the current in an adjacent linear gate means, further includes the step of supplying the base current of one linear gate means to one terminal of a differential summing amplifier and supplying a signal representative of the current in that phase to another terminal of the differential summing amplifier and then supplying an error signal to the base of the linear gate means, thereby assuring that the linear gate means linearly amplifies the base current.

16. The method as set forth in claim 6, wherein the linear gate means comprises a semiconductor linear gate means.

17. The method as set forth in claim 6, wherein the linear gate means comprises a field effect transistor.

18. The method as set forth in claim 6, wherein the linear gate means comprises a power Darlington bipolar junction transistor.

19. The method as set forth in claim 6, wherein the linear gate means comprises an insulated gate bipolar transistor.

20. The method as set forth in claim 1, wherein the primary winding comprises a motor stator positioned around a rotor containing the secondary winding so as to produce a DC induction motor.

21. The method as set forth in claim 1, wherein the primary winding is constructed so as to produce a rotating magnetic field that is used as the DC field of a synchronous condenser.

22. An inverter for inverting direct current electrical power into alternating current electrical power, comprising in combination:
   means for producing a moving magnetic field having substantially constant flux density when the direct current power is applied to a primary winding;
   means for magnetically coupling a secondary winding to the moving magnetic field; and
   means for creating a substantially triangular-shaped current in each phase of the primary winding so as to produce substantially sinusoidal alternating current in each phase of the secondary winding.

23. The inverter as set forth in claim 22, wherein the means for creating a substantially triangular-shaped current in each phase of the primary winding comprises means for creating a perfect triangular-shaped current in each phase of the primary winding so as to produce substantially sinusoidal alternating current each phase of the secondary winding, whereby the direct current is perfectly uniformly consumed.

24. The inverter as set forth in claim 22, wherein the means for creating a substantially triangular-shaped current in each phase of the primary winding comprises means for creating a substantially triangular-shaped current in each phase of the primary winding so as to produce perfectly sinusoidal alternating current each phase of the secondary winding, whereby the direct current is not perfectly uniformly consumed.

25. The inverter as set forth in claim 22, wherein the primary winding comprises a polyphase primary winding.

26. The inverter as set forth in claim 25, wherein the secondary winding comprises a polyphase secondary winding.

27. The inverter as set forth in claim 26, wherein the means for creating a substantially triangular-shaped current in each phase of the primary winding comprises means for operating a linear gate means connected to each phase of the primary winding to create the substantially triangular-shaped current in each phase of the primary winding.

28. The inverter as set forth in claim 27, wherein the means for operating a linear gate means connected to each phase of the primary winding comprises means for operating the linear gate means connected to each phase of the primary winding by means of a substantially triangular-shaped base current supplied to the base of each of the linear gate means.

29. The inverter as set forth in claim 28, wherein the means for operating the linear gate means connected to each phase of the primary winding comprises means for supplying a substantially triangular-shaped base current supplied to the base of each of the linear gate means, with the phases of the primary winding being star-connected.

30. The inverter as set forth in claim 29, wherein the means for supplying a substantially triangular-shaped base current to the base of each of the linear gate means comprises means for supplying a substantially triangular-shaped base current to the base of each of the linear gate means, with the base current in one linear gate means overlapping in time the current in an adjacent linear gate means.

31. The inverter as set forth in claim 30, wherein the means for supplying a substantially triangular-shaped base current to the base of each of the linear gate means, with the base current in one linear gate means overlapping in time the current in an adjacent linear gate means, further includes means for supplying the base current of are linear gate means to one terminal of a differential summing amplifier and supplying a signal representative of the current in that phase to another terminal of the differential summing amplifier and then supplying a error signal to the base of the linear gate means, thereby assuring that the linear gate means linearly amplifies the base current.

32. The inverter as set forth in claim 28, wherein the means for operating the linear gate means connected to each phase of the primary winding comprises means for supplying a substantially triangular-shaped base current supplied to the base of each of the linear gate means, with the phases of the primary winding being mesh-connected, with a pair of oppositely polarized linear gate means being provided for each phase, and with all of the positive polarized linear gate means being connected to a positive bus and all of the negative polarized linear gate means being connected to a negative bus.

33. The inverter as set forth in claim 32, wherein the phases of the primary comprises an odd number of phases.

34. The inverter as set forth in claim 32, wherein the phases of the primary comprises an even number of phases.

35. The inverter as set forth in claim 32, wherein the means for of supplying a substantially triangular-shaped base current supplied to the base of each of the linear gate means comprises means for supplying oppositely polarized substantially triangular-shaped base current to the base of each of the oppositely polarized linear gate means, with the base current in one linear gate means of one polarity overlapping in time the current in an adjacent linear gate means of the same polarity.

36. The inverter as set forth in claim 35, wherein the means for supplying a substantially triangular-shaped base current to the base of each of the linear gate means, with the base current in one linear gate means overlapping in time the current in an adjacent linear gate means, further includes means for supplying the base current of one linear gate means to one terminal of a differential summing amplifier and supplying a signal representative of the current in that phase to another terminal of the differential summing amplifier and then supplying a error signal to the base of the linear gate means, thereby assuring that the linear gate means linearly amplifies the base current.

37. The inverter as set forth in claim 22, wherein the linear gate means comprises a semiconductor linear gate means.

38. The inverter as set forth in claim 22, wherein the linear gate means comprises a field effect transistor.

39. The inverter as set forth in claim 22, wherein the linear gate means comprises a power Darlington bipolar junction transistor.

40. The inverter as set forth in claim 22, wherein the linear gate means comprises an insulated gate bipolar transistor.

41. The inverter as set forth in claim 22, wherein the primary winding comprises a motor stator positioned around a rotor containing the secondary winding so as to produce a DC induction motor.

42. The inverter as set forth in claim 22, wherein the primary winding is constructed so as to produce a rotating magnetic field that is used as the DC field of a synchronous condenser.

* * * * *